(12) United States Patent
Kwak et al.

(10) Patent No.: US 10,551,701 B2
(45) Date of Patent: Feb. 4, 2020

(54) LIQUID CRYSTAL DISPLAY DEVICE AND METHOD FOR FABRICATING THE SAME

(71) Applicant: SAMSUNG DISPLAY CO., LTD., Yongin-si, Gyeonggi-do (KR)

(72) Inventors: Changhun Kwak, Suwon-si (KR); Kihun Jeong, Asan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/404,565

(22) Filed: Jan. 12, 2017

(65) Prior Publication Data
US 2017/0285424 A1   Oct. 5, 2017

(30) Foreign Application Priority Data
Apr. 4, 2016  (KR) .................. 10-2016-0040795

(51) Int. Cl.
*G02F 1/1362*   (2006.01)
*G02F 1/1368*   (2006.01)

(52) U.S. Cl.
CPC ...... *G02F 1/136209* (2013.01); *G02F 1/1368* (2013.01); *G02F 1/13624* (2013.01);
(Continued)

(58) Field of Classification Search
CPC ......... G02F 1/136204; G02F 1/136286; G02F 1/1368; G02F 1/136209; G02F 1/13624; G02F 2001/136295; G02F 2001/136222; G02F 1/0107; G02F 1/1339; G02F 1/13392; G02F 1/13394; G02F 1/161; G02F 1/133377; G02F 2001/13396; G02F 2001/13398; G02F 1/133707; G02F 1/133514; G02F 1/133512; G02F 1/13473; G02F 1/133371; G02F 2001/136218; G02F 1/0121; G02F 1/0327; G02F 1/076; G02F 1/133; G02F 1/13306; G02F 1/1345; G02F 1/13452; G02F 1/13454; G02F 1/13458;
(Continued)

(56) References Cited

U.S. PATENT DOCUMENTS

| | | | |
|---|---|---|---|
| 5,142,386 A * | 8/1992 | Ishihara | G02F 1/1309 349/106 |
| 6,392,735 B1 * | 5/2002 | Tani | G02F 1/1339 349/153 |

(Continued)

FOREIGN PATENT DOCUMENTS

| | | |
|---|---|---|
| KR | 1020060102145 A | 9/2006 |
| KR | 1020070062088 A | 6/2007 |

(Continued)

*Primary Examiner* — Shan Liu
(74) *Attorney, Agent, or Firm* — Cantor Colburn LLP

(57) ABSTRACT

A liquid crystal display ("LCD") device includes a first substrate and a second substrate spaced apart from each other, a liquid crystal layer between the first substrate and the second substrate, a common line on the first substrate, a common electrode on the second substrate, and a short circuit portion which is disposed between the common line and the common electrode and includes a protruding portion on the common line, and a short circuit electrode on the protruding portion and the common line, and at least a portion of the protruding portion includes a darkened area.

30 Claims, 33 Drawing Sheets

(52) U.S. Cl.
CPC .. *G02F 1/136204* (2013.01); *G02F 1/136286* (2013.01); *G02F 2001/136222* (2013.01); *G02F 2001/136295* (2013.01)

(58) Field of Classification Search
CPC ........ G02F 2001/133388; G02F 2001/133612; G02F 2001/13456; H01L 27/3246; H01L 23/48; H01L 23/49572; H01L 2224/50; H01L 2224/79; H01L 2224/86; H01L 2225/06579; H01L 2225/107; H01L 24/50; H01J 11/44; H01J 2211/444; H01J 2329/323; H01J 29/327; G09G 2300/0426; G09G 2300/0408; G09G 3/3655; G09G 3/3674; G09G 3/3685; G09G 2290/00; G09G 2320/0223; G09G 2300/0421; G09G 3/36
USPC .................. 349/155–157, 106–111, 149–152
See application file for complete search history.

(56) References Cited

U.S. PATENT DOCUMENTS

| | | | | |
|---|---|---|---|---|
| 7,088,418 | B1* | 8/2006 | Yamashita | .......... G02F 1/13394 |
| | | | | 349/153 |
| 2003/0058518 | A1* | 3/2003 | Toyoshima | ............ G02B 5/201 |
| | | | | 359/259 |
| 2005/0140892 | A1* | 6/2005 | Kim | ................. G02F 1/133707 |
| | | | | 349/139 |
| 2007/0126006 | A1* | 6/2007 | Lin | ................... G02F 1/136209 |
| | | | | 257/59 |
| 2008/0068536 | A1* | 3/2008 | Kim | ................... G02F 1/133371 |
| | | | | 349/106 |
| 2009/0033842 | A1* | 2/2009 | Yu | ..................... G02F 1/136209 |
| | | | | 349/106 |
| 2011/0001911 | A1* | 1/2011 | Shirai | .................... G02B 5/201 |
| | | | | 349/106 |
| 2011/0090445 | A1* | 4/2011 | Kim | ...................... G02F 1/1339 |
| | | | | 349/139 |
| 2011/0122357 | A1 | 5/2011 | Chang et al. | |
| 2011/0187631 | A1* | 8/2011 | Lee | .......................... G09G 3/36 |
| | | | | 345/87 |
| 2012/0098811 | A1 | 4/2012 | Park | |
| 2013/0235278 | A1* | 9/2013 | Tanaka | .................. G02F 1/1333 |
| | | | | 348/739 |
| 2014/0009729 | A1* | 1/2014 | Otaki | ................. B23K 26/0613 |
| | | | | 349/106 |
| 2014/0049717 | A1* | 2/2014 | Kwak | ............... G02F 1/133512 |
| | | | | 349/43 |
| 2014/0063420 | A1* | 3/2014 | Tsai | ....................... G02B 5/201 |
| | | | | 349/106 |
| 2015/0092138 | A1 | 4/2015 | Kwak et al. | |
| 2015/0198842 | A1 | 7/2015 | Kwak et al. | |
| 2015/0370116 | A1* | 12/2015 | Chae | ................... G02F 1/13394 |
| | | | | 349/43 |

FOREIGN PATENT DOCUMENTS

| | | |
|---|---|---|
| KR | 1020120029100 A | 3/2012 |
| KR | 1020120061129 A | 6/2012 |
| KR | 1020140098906 A | 8/2014 |

* cited by examiner

LIQUID CRYSTAL DISPLAY DEVICE AND METHOD FOR FABRICATING THE SAME

This application claims priority to Korean Patent Application No. 10-2016-0040795, filed on Apr. 4, 2016, and all the benefits accruing therefrom under 35 U.S.C. § 119, the content of which in its entirety is herein incorporated by reference.

BACKGROUND

1. Field

Exemplary embodiments of the invention relate to a display device, and more particularly, to a liquid crystal display ("LCD") device which effectively reduces reflected light in a short circuit portion and prevents an occurrence of a black spot in a repair process and to a method of manufacturing the LCD device.

2. Description of the Related Art

A liquid crystal display ("LCD") devices is one of most widely used types of flat panel display ("FPD") devices. An LCD device generally includes two substrates including two electrodes respectively formed thereon and a liquid crystal layer interposed therebetween. Upon respectively applying voltages to the two electrodes, liquid crystal molecules of the liquid crystal layer are rearranged such that an amount of transmitted light is controlled in the LCD device.

SUMMARY

Exemplary embodiments of the invention are directed to a liquid crystal display ("LCD") device which effectively reduces reflected light in a short circuit portion and prevents an occurrence of a black spot in a repair process and to a method of manufacturing the LCD device.

According to an exemplary embodiment of the invention, an LCD device includes a first substrate and a second substrate spaced apart from each other, a liquid crystal layer between the first substrate and the second substrate, a common line on the first substrate, a common electrode on the second substrate, and a short circuit portion between the common line and the common electrode. The short circuit portion includes a protruding portion on the common line, and a short circuit electrode on the protruding portion and the common line, and at least a portion of the protruding portion includes a darkened area.

In an exemplary embodiment, the protruding portion may include a plurality of protrusion patterns between the common line and the short circuit electrode, and at least a portion of at least one of the plurality of protrusion patterns may include the darkened area.

In an exemplary embodiment, the LCD device may further include a color filter on the first substrate. The at least one of the protrusion patterns including the darkened area may include the same material as that included in the color filter.

In an exemplary embodiment, the color filter may include at least two unit color filters having different colors from each other, and the at least one of the protrusion patterns including the darkened area may include the same material as that included in one of the at least two unit color filters that has a largest height.

In an exemplary embodiment, the color filter may include at least two unit color filters having different colors from each other, and at least two protrusion patterns including the darkened area may include materials of different unit color filters, respectively.

In an exemplary embodiment, the LCD device may further include a gate insulating layer on the first substrate. The at least one of the protrusion patterns including the darkened area may include the same material as that included in the gate insulating layer.

In an exemplary embodiment, the LCD device may further include a passivation layer on the first substrate. The at least one of the protrusion patterns including the darkened area may include the same material as that included in the passivation layer.

In an exemplary embodiment, the LCD device may further include an insulating interlayer on the first substrate. The at least one of the protrusion patterns including the darkened area may include the same material as that included in the insulating interlayer.

In an exemplary embodiment, the LCD device may further include a sealing portion surrounding the liquid crystal layer and disposed between a non-display area of the first substrate and a non-display area of the second substrate.

In an exemplary embodiment, the LCD device may further include, on the first substrate, a light blocking portion defined with a first aperture defining a short circuit area in which the short circuit portion is disposed and a second aperture defining a pixel area of the first substrate.

In an exemplary embodiment, the LCD device may further include a color filter on the first substrate. The darkened area may have a transmittance lower than a transmittance of the color filter and higher than a transmittance of the light blocking portion.

In an exemplary embodiment, the LCD device may further include a gate line, a data line, and a pixel electrode on the first substrate, a gate electrode connected to the gate line, a source electrode connected to the data line, and a drain electrode connected to the pixel electrode, and a color filter which is disposed on the first substrate and does not overlap at least one of a first portion of the source electrode not overlapping the gate electrode and a second portion of the drain electrode not overlapping the gate electrode.

In an exemplary embodiment, the color filter may overlap another portion of the switching element except for the first portion and the second portion.

In an exemplary embodiment, the color filter may include a first overlapping portion overlapping the pixel electrode, and a second overlapping portion overlapping another portion of the switching element.

In an exemplary embodiment, the LCD device may further include a column spacer on the second overlapping portion.

In an exemplary embodiment, the first overlapping portion and the second overlapping portion may be unitary.

In an exemplary embodiment, the first overlapping portion and the second overlapping portion may be separated from each other.

In an exemplary embodiment, the LCD device may further include a gate line, a storage electrode, a data line, a first sub-pixel electrode, and a second sub-pixel electrode on the first substrate, a first switching element including a first gate electrode connected to the gate line, a first source electrode connected to the data line, and a first drain electrode connected to the first sub-pixel electrode, a second switching element including a second gate electrode connected to the gate line, a second source electrode connected to the first source electrode, and a second drain electrode connected to the second sub-pixel electrode, a third switching element including a third gate electrode connected to the gate line, a third source electrode connected to the second drain electrode, and a third drain electrode connected to the storage electrode, and a color filter which is disposed on the first substrate and does not overlap at least one of a first portion of the first source electrode not overlapping the first gate electrode, a second portion of the first drain electrode not overlapping the first gate electrode and the storage electrode, a third portion of the second drain electrode not overlapping the second gate electrode and the storage electrode, and a fourth portion of the third source electrode not overlapping the third gate electrode and the storage electrode.

In an exemplary embodiment, the color filter may include a first overlapping portion overlapping the first sub-pixel electrode, a second overlapping portion overlapping the second sub-pixel electrode, and a third overlapping portion overlapping another portion of the first, second, and third switching elements except for the first, second, third, and fourth portions.

In an exemplary embodiment, the LCD device may further include a column spacer on the third overlapping portion.

In an exemplary embodiment, at least one of the first overlapping portion and the second overlapping portion may be unitary with the third overlapping portion.

In an exemplary embodiment, the first overlapping portion, the second overlapping portion, and the third overlapping portion may be separated from one another.

According to an exemplary embodiment of the invention, an LCD device includes a first substrate and a second substrate spaced apart from each other, a liquid crystal layer between the first substrate and the second substrate, a common line on the first substrate, a common electrode on the second substrate, a light blocking portion disposed on the second substrate and defining a short circuit area, and a plurality of short circuit portions between the common line and the common electrode in the short circuit area. Each of the short circuit portions includes a protruding portion on the common line, and a short circuit electrode on the protruding portion and the common line, and at least a portion of the protruding portion includes a darkened area.

In an exemplary embodiment, the protruding portion may include a plurality of protrusion patterns between the common line and the short circuit electrode, and at least a portion of at least one of the plurality of protrusion patterns may include a darkened area.

In an exemplary embodiment, the LCD device may further include a color filter on the first substrate. The at least one of the protrusion patterns including the darkened area may include the same material as that included in the color filter.

In an exemplary embodiment, the color filter may include at least two unit color filters having different colors from each other, and the at least one of the protrusion patterns including the darkened area may include the same material as that included in one of the at least two unit color filters that has a largest height.

In an exemplary embodiment, the color filter may include at least two unit color filters having different colors from each other, and at least two protrusion patterns including the darkened area may include materials of different unit color filters, respectively.

In an exemplary embodiment, the LCD device may further include a gate insulating layer on the first substrate. The at least one of the protrusion patterns including the darkened area may include the same material as that included in the gate insulating layer.

In an exemplary embodiment, the LCD device may further include a passivation layer on the first substrate. The at least one of the protrusion patterns including the darkened area may include the same material as that included in the passivation layer.

In an exemplary embodiment, the LCD device may further include an insulating interlayer on the first substrate. The at least one of the protrusion patterns including the darkened area may include the same material as that included in the insulating interlayer.

In an exemplary embodiment, the protruding portion may have one of a square shape, a rectangular shape, a circular shape, and an elliptical shape.

In an exemplary embodiment, each side of the protruding portion may have a length greater than or equal to about 20 micrometers ($\mu m$).

In an exemplary embodiment, a length between adjacent ones of the protruding portions may be in a range of about 1 $\mu m$ to about 10 $\mu m$.

In an exemplary embodiment, respective short circuit electrodes of the short circuit portions may be connected to one another.

In an exemplary embodiment, respective protruding portions of the short circuit portions may be disposed on different portions of the common line.

According to an exemplary embodiment of the invention, a method of manufacturing an LCD device includes preparing a substrate having a display area and a non-display area, forming a common line in the non-display area of the substrate, forming a color filter in the display area and forming a protruding portion of a short circuit portion on the common line in the non-display area, forming a darkened area in at least a portion of the protruding portion, and forming a pixel electrode in the display area.

In an exemplary embodiment, the protruding portion may include a plurality of protrusion patterns, and at least a portion of at least one of the plurality of protrusion patterns may include a darkened area.

In an exemplary embodiment, at least one of the plurality of protrusion patterns may be simultaneously provided with the color filter and may include the same material as that included in the color filter.

In an exemplary embodiment, the protrusion pattern including the darkened area may include the same material as that included in one of the color filters that has a largest height.

In an exemplary embodiment, the forming of the darkened area in at least a portion of the protruding portion may include carbonizing the protruding portion.

In an exemplary embodiment, the carbonizing of the protruding portion may include irradiating an intense light to the protruding portion.

The foregoing is illustrative only and is not intended to be in any way limiting. In addition to the illustrative exemplary embodiments, and features described above, further exemplary embodiments, and features will become apparent by reference to the drawings and the following detailed description.

BRIEF DESCRIPTION OF THE DRAWINGS

The above and other features and exemplary embodiments of the invention of invention will be more clearly understood from the following detailed description taken in conjunction with the accompanying drawings, in which.

DETAILED DESCRIPTION

Figure 1:
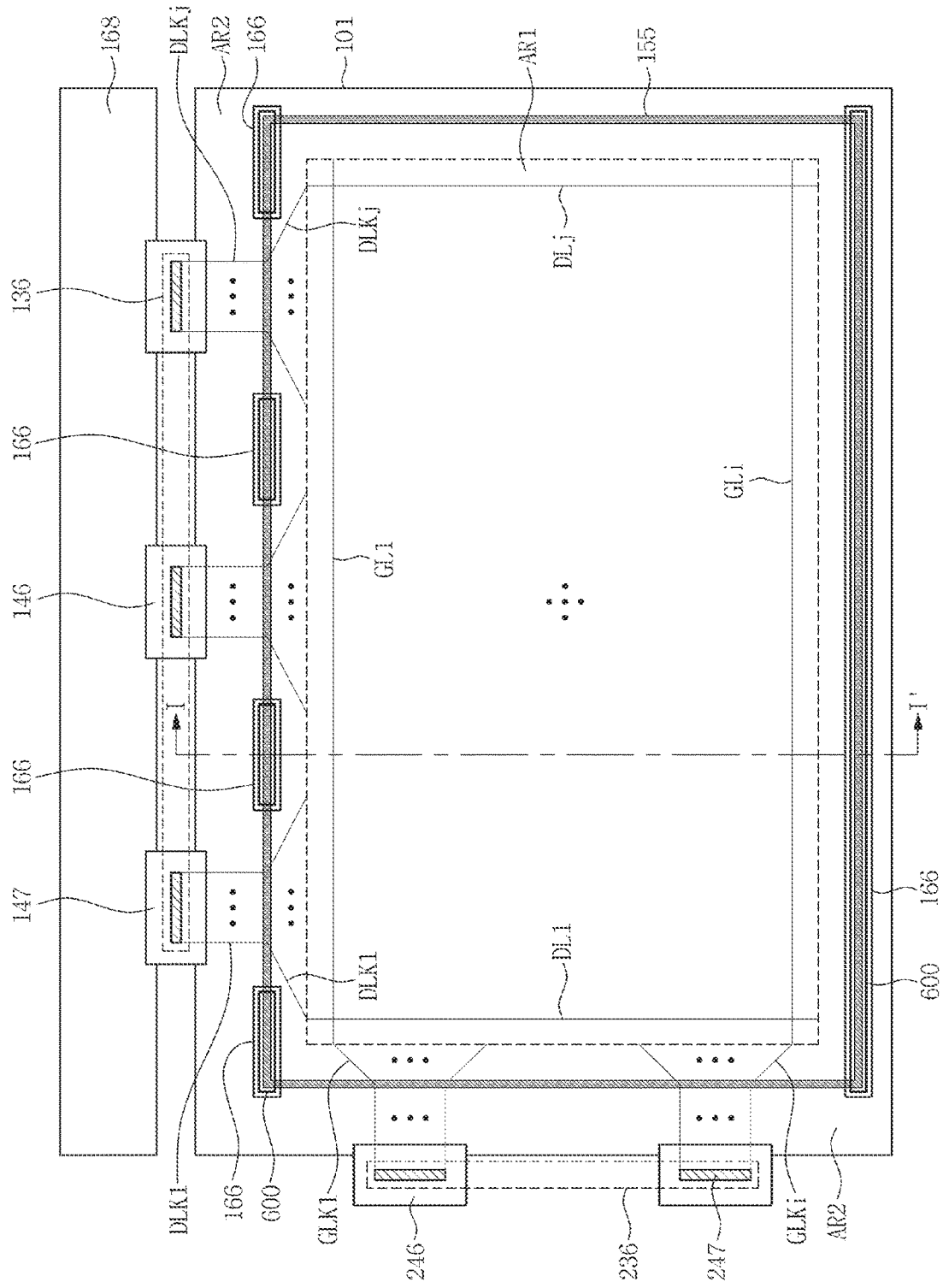
FIG. 1 is a view illustrating an exemplary embodiment of a first panel and a peripheral circuit connected to the first panel in a liquid crystal display ("LCD") device.

Advantages and features of the invention and methods for achieving them will be made clear from exemplary embodiments described below in detail with reference to the accompanying drawings. The invention may, however, be embodied in many different forms and should not be construed as being limited to the exemplary embodiments set forth herein. Rather, these exemplary embodiments are provided so that this disclosure will be thorough and complete, and will fully convey the scope of the invention to those skilled in the art. The invention is merely defined by the scope of the claims. Therefore, well-known constituent elements, operations and techniques are not described in detail in the exemplary embodiments in order to prevent the invention from being obscurely interpreted. Like reference numerals refer to like elements throughout the specification.

In the drawings, certain elements or shapes may be illustrated in an enlarged manner or in a simplified manner to better illustrate the invention, and other elements present in an actual product may also be omitted. Thus, the drawings are intended to facilitate the understanding of the invention.

When a layer, area, or plate is referred to as being "on" another layer, area, or plate, it may be directly on the other layer, area, or plate, or intervening layers, areas, or plates may be present therebetween. Conversely, when a layer, area, or plate is referred to as being "directly on" another layer, area, or plate, intervening layers, areas, or plates may be absent therebetween. Further when a layer, area, or plate is referred to as being "below" another layer, area, or plate, it may be directly below the other layer, area, or plate, or intervening layers, areas, or plates may be present therebetween. Conversely, when a layer, area, or plate is referred to as being "directly below" another layer, area, or plate, intervening layers, areas, or plates may be absent therebetween.

The spatially relative terms "below", "beneath", "less", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in a case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" can be termed likewise without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms used herein (including technical and scientific terms) have a same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the specification.

Hereinafter, an exemplary embodiment of a liquid crystal display ("LCD") device and a method of manufacturing the LCD device will be described in detail with reference to FIGS. 1 to 22G.

Figure 2:
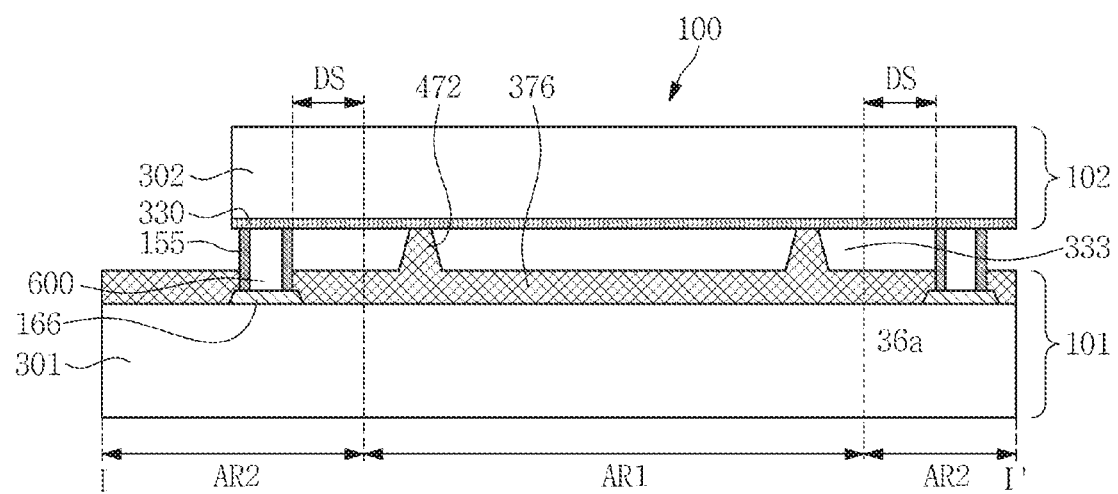
FIG. 2 is a cross-sectional view taken along line I-I' of FIG. 1.
Figure 3A:
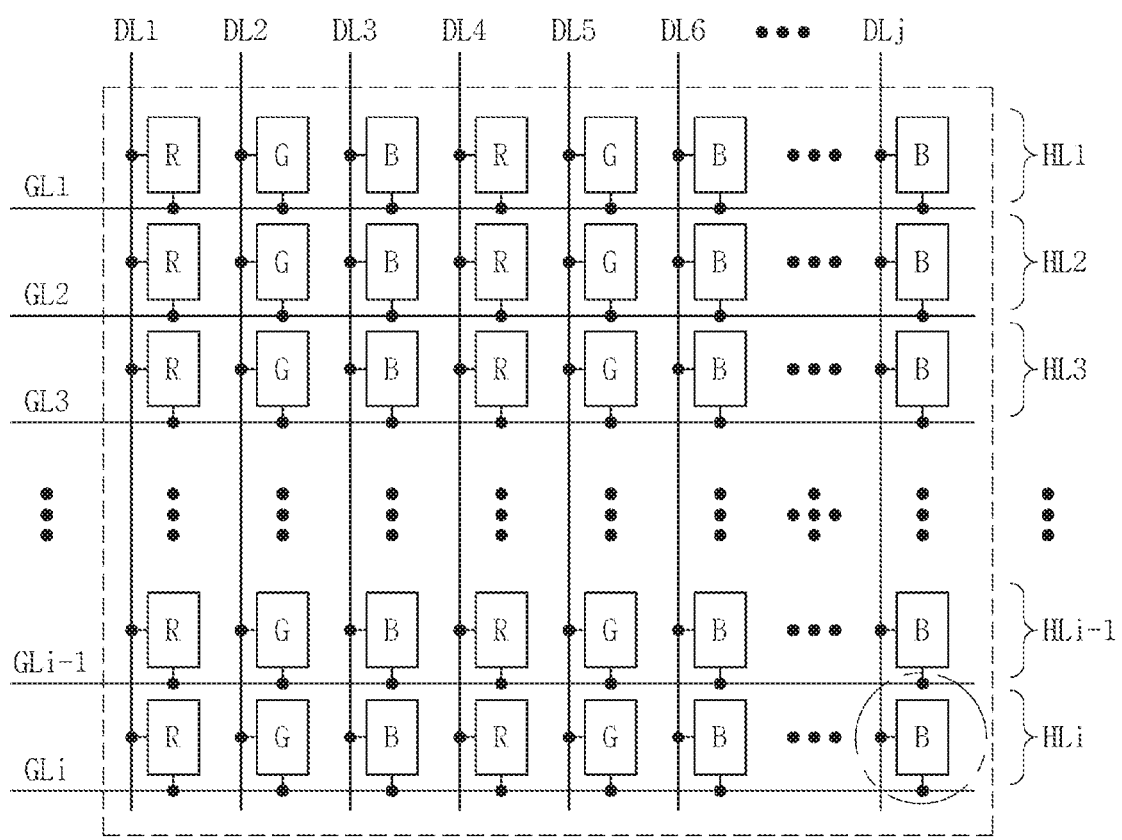
FIG. 3A is a plan view illustrating pixels included in a display panel of FIG. 2.
Figure 3B:
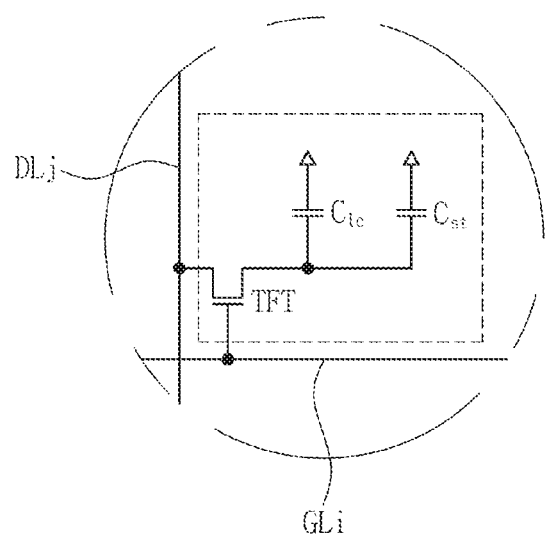
FIG. 3B is an enlarged view of a portion of the pixels of FIG. 3A.

FIG. 1 is a view illustrating an exemplary embodiment of a first panel and a peripheral circuit connected to the first panel in an LCD device, FIG. 2 is a cross-sectional view taken along line I-I' of FIG. 1, and FIG. 3A is a plan view illustrating pixels included in a display panel of FIG. 2, and FIG. 3B is an enlarged view of a portion of the pixels of FIG. 3A.

As illustrated in FIGS. 1 and 2, an exemplary embodiment of an LCD device includes a display panel 100 (refer to FIG. 2), a gate driver 236, and a data driver 136.

As illustrated in FIG. 2, the display panel 100 includes a first panel 101, a second panel 102, a liquid crystal layer 333, and a sealing portion 155. The display panel 100 is divided into a display area AR1 and a non-display area AR2.

The display area AR1 of the display panel 100 corresponds to a display area AR1 of the first panel 101 and a display area AR1 of the second panel 102. The non-display area AR2 of the display panel 100 corresponds to a non-display area AR2 of the first panel 101 and a non-display area AR2 of the second panel 102.

The sealing portion 155 is disposed between the first panel 101 and the second panel 102. In detail, as illustrated in FIG. 2, the sealing portion 155 is disposed between the non-display area AR2 of the first panel 101 and the non-display area AR2 of the second panel 102. In an exemplary embodiment, as illustrated in FIG. 1, the sealing portion 155 may have a closed-loop shape surrounding the display area AR1 in a plan view, for example.

The liquid crystal layer 333 is disposed in a space defined by the first panel 101, the second panel 102, and the sealing portion 155. In an exemplary embodiment, the liquid crystal layer 333 may include homeotropic liquid crystal molecules having a negative dielectric anisotropy, for example. In an alternative exemplary embodiment, the liquid crystal layer 333 may include a photopolymerizable material, for example, and in the alternative exemplary embodiment, the photopolymerizable material may be a reactive monomer or a reactive mesogen, for example.

As illustrated in FIG. 2, the first panel 101 has a larger planar area than that of the second panel 102. The first panel 101 and the second panel 102 face each other with the liquid crystal layer 333 therebetween.

As illustrated in FIGS. 1 and 2, the first panel 101 includes a first substrate 301, a plurality of gate lines GL1 to GLi, a plurality of data lines DL1 to DLj, and a common line 166. The gate lines GL1 to GLi, the data lines DL1 to DLj, and the common line 166 are disposed on the first substrate 301.

The data lines DL1 to DLj intersect the gate lines GL1 to GLi. The gate lines GL1 to GLi extend to the non-display area AR2 to be connected to the gate driver 236, and the data lines DL1 to DLj extend to the non-display area AR2 to be connected to the data driver 136.

A portion of the gate line in the non-display area AR2 may be referred to as a gate link line. Respective gate link lines GLK1 to GLKi of the gate lines GL1 to GLi intersect the sealing portion 155. A portion of the data line in the non-display area AR2 may be referred to as a data link line. Respective data link lines DLK1 to DLKj of the data lines DL1 to DLj intersect the sealing portion 155.

The gate driver 236 includes a plurality of gate driving integrated circuits 247. The gate driving integrated circuits 247 generate gate signals and sequentially provide the gate signals to the first to i-th gate lines GL1 to GLi.

Each of the gate driving integrated circuits 247 is disposed (e.g., mounted) on a gate carrier 246. The gate carriers 246 are electrically connected to the first panel 101. In an exemplary embodiment, each of the gate carriers 246 may be electrically connected to the non-display area AR2 of the first substrate 301, for example. In an exemplary embodiment, the gate carrier 246 may be a gate tape carrier package ("TCP"), for example. However, the invention is not limited thereto, and the gate carrier 246 may include various other types such as chip on glass ("COG").

The data driver 136 includes a plurality of data driving integrated circuits 147. The data driving integrated circuits 147 receive digital image data signals and a data control signal from a timing controller. The data driving integrated circuits 147 sample the digital image data signals according to the data control signal, latch the sampled image data signals corresponding to one horizontal line in each horizontal period, and apply the latched image data signals to the data lines DL1 to DLj. That is, the data driving integrated circuits 147 convert the digital image data signals applied from the timing controller into analog image signals using a gamma voltage input from a power supplier (not illustrated) and apply the converted analog image signals to the data lines DL1 to DLj.

Each of the data driving integrated circuits 147 is disposed (e.g., mounted) on a data carrier 146. The data carriers 146 are connected between a circuit board 168 and the first panel 101. In an exemplary embodiment, each of the data carriers 146 may be electrically connected between the circuit board 168 and the non-display area AR2 of the first substrate 301, for example. In an exemplary embodiment, the data carrier 146 may be a data TCP, for example. However, the invention is not limited thereto, and the data carrier 146 may include various other types such as COG.

The aforementioned timing controller and the power supplier may be disposed on the circuit board 168, and the data carrier 146 includes input wirings which transmit various signals applied from the timing controller and the power supplier to the data driving integrated circuits 147 and output wirings that transmit image data signals output from the data driving integrated circuits 147 to corresponding ones of the data lines. In an exemplary embodiment, at least one carrier 146 may further include auxiliary wirings that may transmit various signals applied from the timing controller and the power supplier to the gate driver 236, and the auxiliary wirings are connected to panel wirings on the first panel 101. The panel wirings connect the auxiliary wirings and the gate driver 236 to one another. The panel wirings may be disposed in the non-display area AR2 of the first substrate 301 in a line-on-glass manner.

The common line 166 is disposed between the sealing portion 155 and the first substrate 301. The common line 166 is disposed along the sealing portion 155. However, as illustrated in FIG. 1, the common line 166 is absent in an intersecting portion among the sealing portion 155 and the gate link lines GLK1 to GLKi. In an exemplary embodiment, as illustrated in FIG. 1, the common line 166 is absent in an intersecting portion among the sealing portion 155 and the data link lines DLK1 to DLKj. In an alternative exemplary embodiment, since the data link lines DLK1 to DLKj and the common line 166 are disposed on different layers, the common line 166 may be disposed at an intersecting portion among the sealing portion 155 and the data link lines DLK1 to DLKj. However, in the exemplary embodiment, a capacitor may be provided among the common line 166 and the data link lines DLK1 to DLKj, and the capacitor may affect the image data signal of the data lines DL1 to DLj. Accordingly, it is desirable that the common line 166 should not be disposed at an intersecting portion among the sealing portion 155 and the data link lines DLK1 to DLKj.

The common line 166 receives a common voltage from the aforementioned power supplier. To this end, the common line 166 may be connected to the power supplier through at least one of a signal transmission line on the gate carrier 246 and a signal transmission line on the data carrier 146.

The second panel 102 includes a second substrate 302 and a common electrode 330 on the second substrate 302.

The common electrode 330 of the second panel 102 is connected to the common line 166 of the first panel 101 through a short circuit portion 600. The common electrode 330 receives the common voltage from the common line 166 through the short circuit portion 600.

As illustrated in FIGS. 3A and 3B, the display panel 100 includes a plurality of pixels R, G, and B. As illustrated in FIGS. 3A and 3B, the pixels R, G, and B are disposed in the display area AR1 of the display panel 100.

In an exemplary embodiment, the pixels R, G, and B are arranged in a matrix, for example. However, the invention is not limited thereto, and the pixels may not be arranged in a matrix. In the exemplary embodiment, the pixels R, G, and B include a red pixel R displaying a red image, a green pixel G displaying a green image, and a blue pixel B displaying a blue image, for example. In the exemplary embodiment, the red pixel R, the green pixel G, and the blue pixel B that are adjacently disposed in a horizontal direction may define a unit pixel for displaying a unit image. However, the invention is not limited thereto, and the pixels may include various other color filters.

There are "j" number of pixels arranged along an n-th (n is one selected from 1 to i) horizontal line (hereinafter, n-th horizontal line pixels), which are connected to the first to j-th data lines DL1 to DLj, respectively. Further, the n-th horizontal line pixels are connected to the n-th gate line in common. Accordingly, each of the n-th horizontal line pixels receives an n-th gate signal. That is, "j" number of pixels disposed in the same horizontal line receive the same gate signal, while pixels disposed in different horizontal lines receive different gate signals, respectively. In an exemplary embodiment, each of the red pixel R, the green pixel G, and the blue pixel B in the first horizontal line HL1 receives a first gate signal, while each of the red pixel R, the green pixel G, and the blue pixel B in the second horizontal line HL2 receives a second gate signal that has a different timing from that of the first gate signal, for example.

As illustrated in FIG. 3B, each of the pixels R, G, and B includes a switching element TFT, a liquid crystal capacitor Clc, and a storage capacitor Cst. In an exemplary embodiment, the switching element TFT may be a thin film transistor, for example.

The switching element TFT is turned on according to a gate signal applied from the gate line GLi. The turned-on switching element TFT applies the analog image data signal applied from the data line DLj to the liquid crystal capacitor Clc and the storage capacitor Cst.

The liquid crystal capacitor Clc includes a pixel electrode PE (refer to FIG. 6) and the common electrode 330 which oppose each other.

The storage capacitor Cst includes the pixel electrode PE and an opposing electrode which oppose each other. Herein, the opposing electrode may be a previous gate line GLi-1 or a transmission line (not illustrated) which transmits the common voltage.

In an exemplary embodiment, as illustrated in FIG. 2, the first panel 101 may further include a light blocking portion 376. Hereinafter, the light blocking portion 376 will be described in detail with reference to FIGS. 2 and 4.

Figure 4:
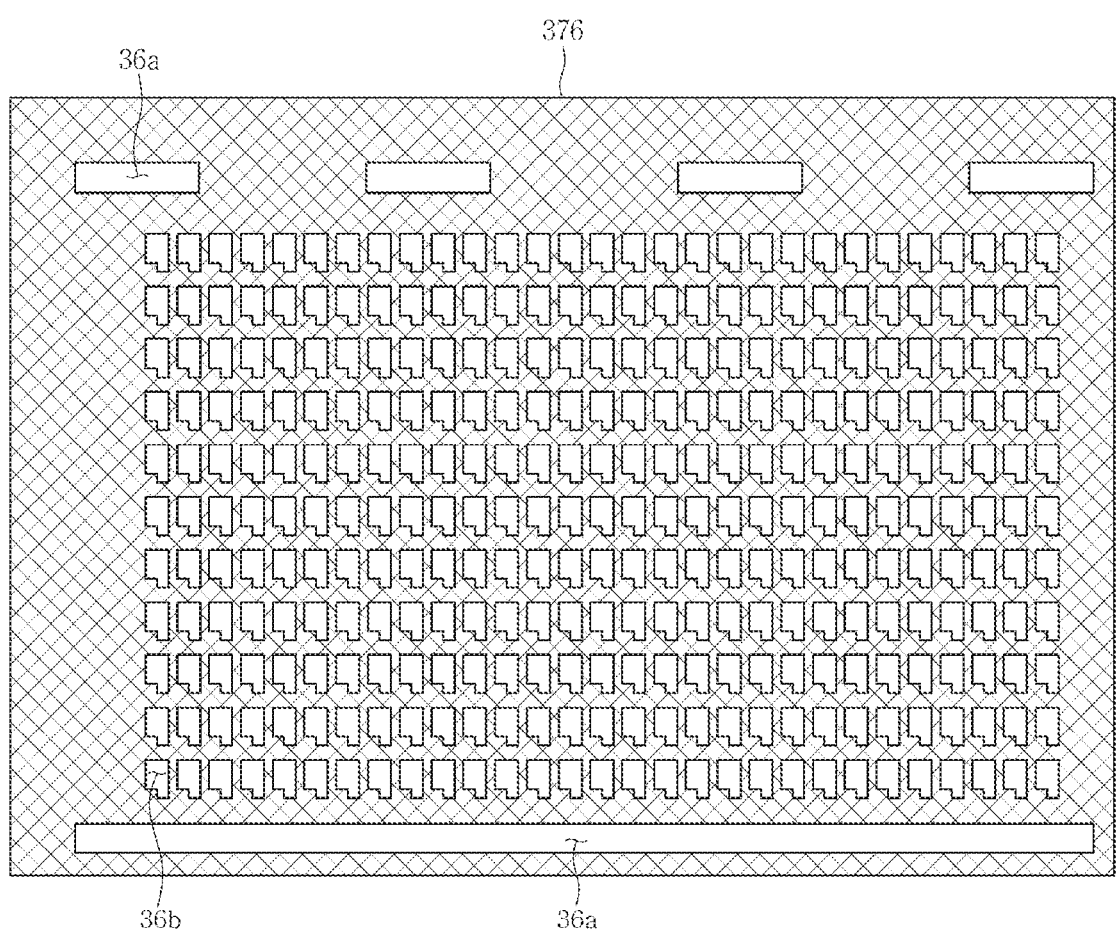
FIG. 4 is a plan view illustrating a light blocking portion of FIG. 2.

FIG. 4 is a plan view illustrating the light blocking portion 376 of FIG. 2.

As illustrated in FIG. 2, the light blocking portion 376 is disposed on the first substrate 301. A portion of the light blocking portion 376 is surrounded by the sealing portion 155. In an exemplary embodiment, a portion of the light blocking portion 376 in the display area AR1 and a portion of the light blocking portion 376 in a dead space area DS are surrounded by the sealing portion 155, for example.

As illustrated in FIG. 4, a first aperture 36a and a second aperture 36b are defined in the light blocking portion 376.

The first aperture 36a is defined at an edge portion of the light blocking portion 376. In other words, the first aperture 36a is defined at the edge portion of the light blocking portion 376 corresponding to the short circuit portion 600. The edge portion of the light blocking portion 376 corresponds to the non-display area AR2. The first aperture 36a defines the short circuit area, and the short circuit portion 600 is disposed in the short circuit area. By way of example, five first apertures 36a, separated from one another, are illustrated in FIG. 4. The invention is not limited thereto, and the number of the first apertures 36a may be less than or greater than five. The five first apertures 36a define five short circuit areas, respectively.

The second aperture 36b is defined at a central portion of the light blocking portion 376. The second aperture 36b of the light blocking portion 376 defines a pixel area. In other words, the second aperture 36b is defined corresponding to the pixel electrode PE of each pixel. The light blocking portion 376 blocks light at a portion except for the second apertures 36b. In an exemplary embodiment, the light blocking portion 376 is disposed on the switching element TFT, the gate lines GL1 to GLi, and the data lines DL1 to DLj, and prevents light transmitted through the switching element TFT, the gate lines GL1 to GLi, and the data lines DL1 to DLj from being emitted outwards, for example.

As illustrated in FIG. 2, a column spacer 472 may be disposed on the light blocking portion 376. The column spacer 472 has a shape protruding toward the second panel 102 up to a predetermined height. The column spacer 472 maintains a cell gap uniform between the first panel 101 and the second panel 102. In an exemplary embodiment, the column spacer 472 and the light blocking portion 376 may be unitary. In the exemplary embodiment, the column spacer 472 and the light blocking portion 376 may be simultaneously provided using the same material.

Figure 5:
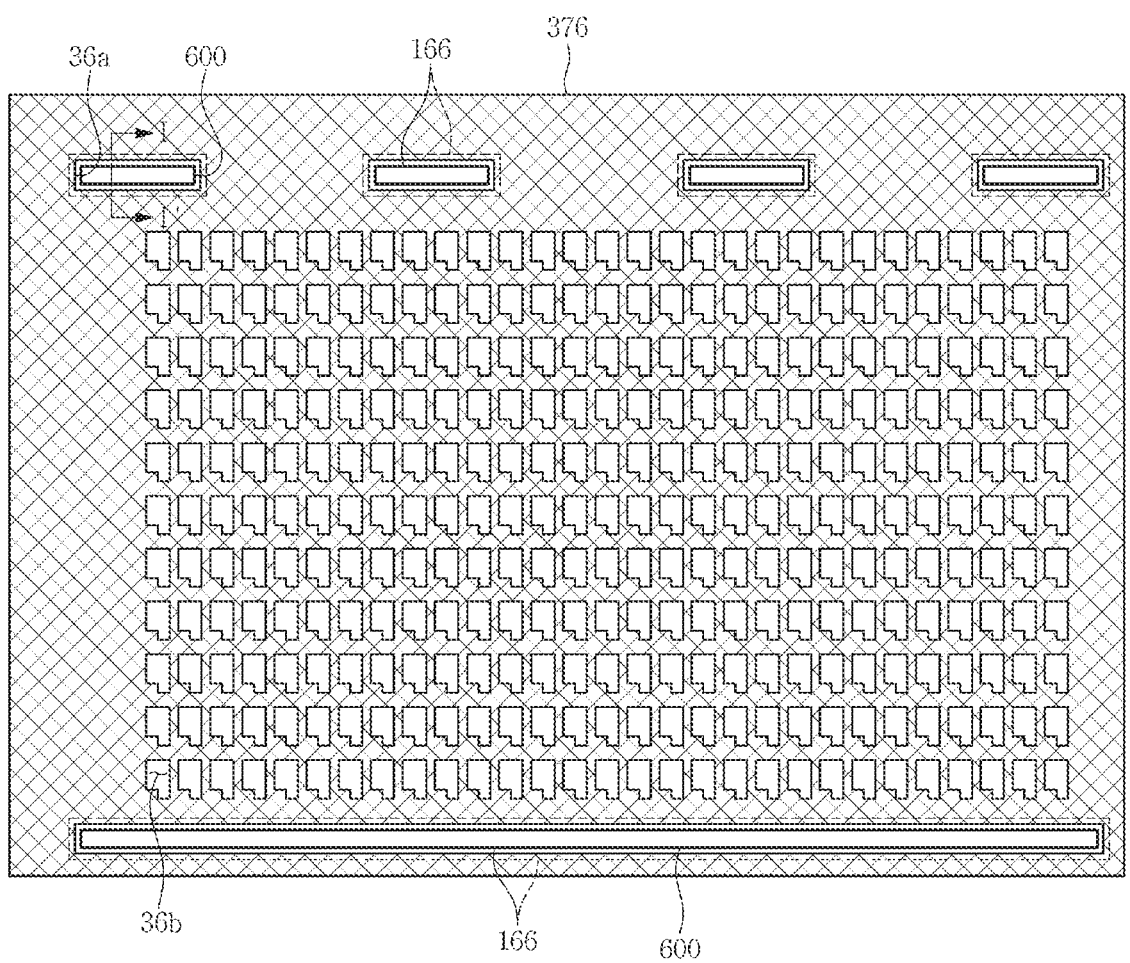
FIG. 5 is a view illustrating an exemplary embodiment of a short circuit portion in a first aperture of the light blocking portion of FIG. 4 and a common line below the short circuit portion.
Figure 6:
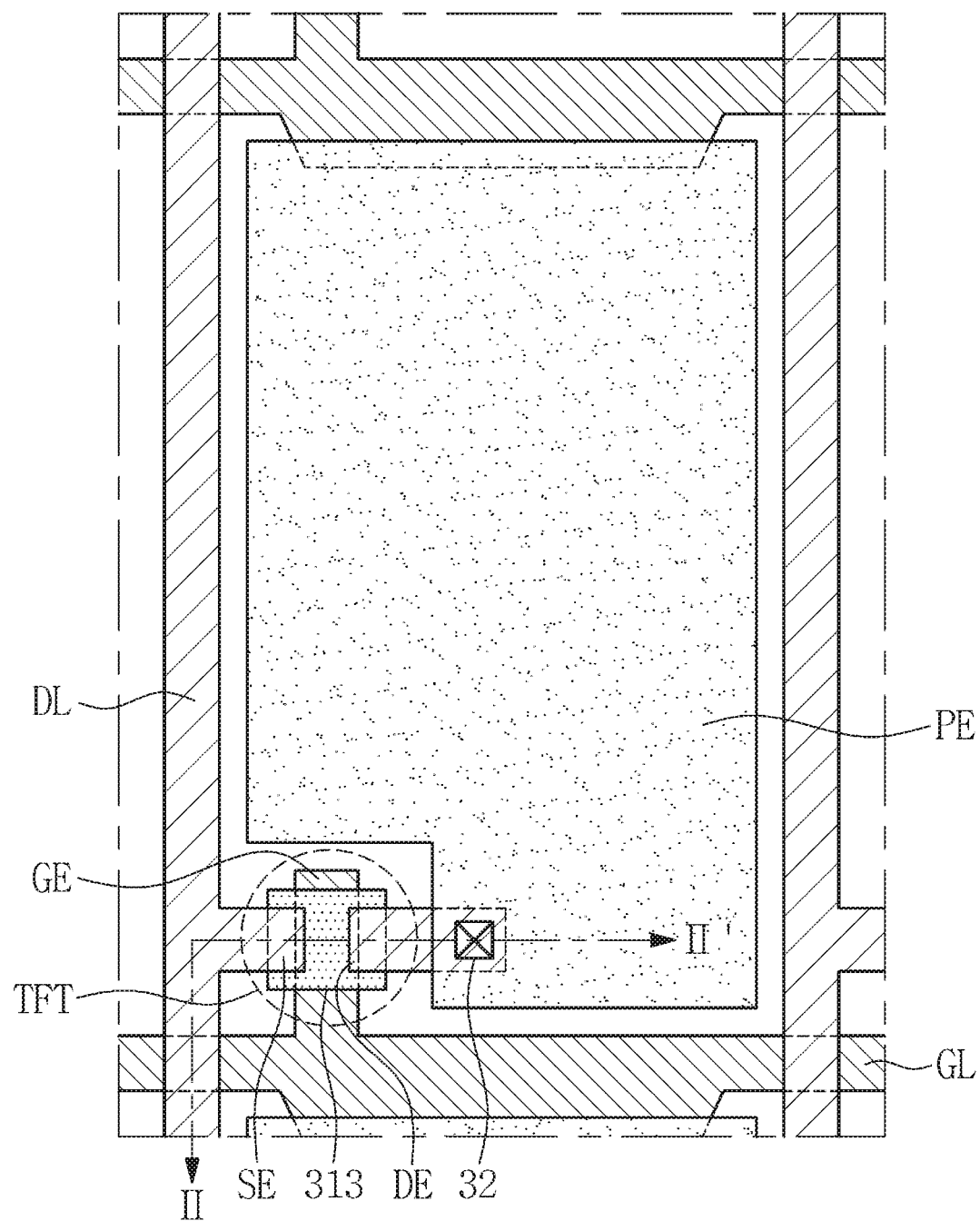
FIG. 6 is a plan view illustrating an exemplary embodiment of a pixel corresponding to a single pixel area of FIG. 5.
Figure 7:
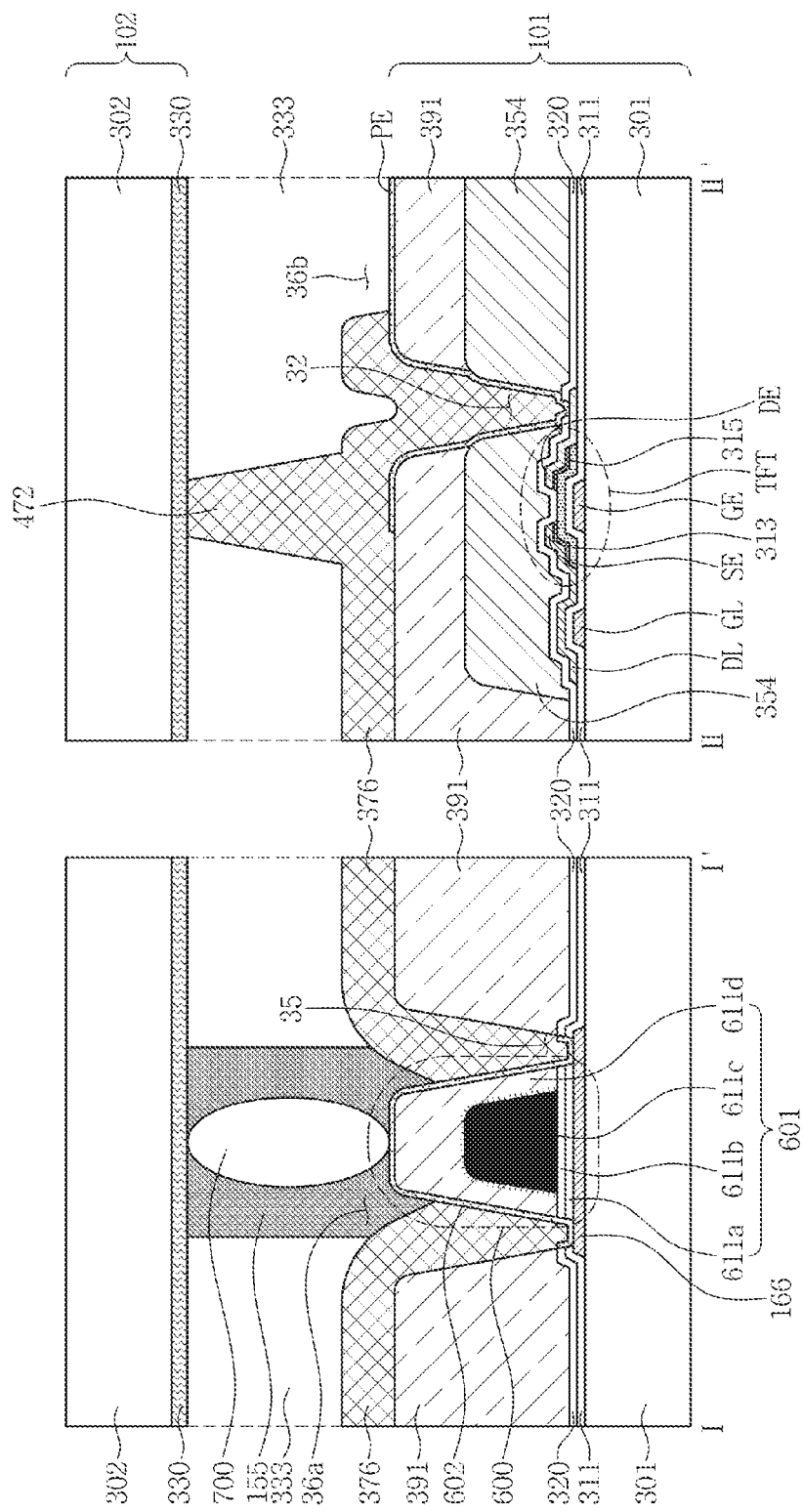
FIG. 7 is a cross-sectional view taken along line I-I' of FIG. 5 and line II-II' of FIG. 6.

FIG. 5 is a view illustrating an exemplary embodiment of the short circuit portion 600 in the first aperture 36a of the light blocking portion 376 of FIG. 4 and the common line 166 below the short circuit portion 600, FIG. 6 is a plan view illustrating an exemplary embodiment of a pixel corresponding to a single pixel area of FIG. 5, and FIG. 7 is a cross-sectional view taken along line I-I' of FIG. 5 and line II-II' of FIG. 6.

As illustrated in FIGS. 5, 6, and 7, the first panel 101 includes a first substrate 301, a gate line GL, a data line DL, a common line 166, a switching element TFT, a gate insulating layer 311, a passivation layer 320, a color filter 354, an insulating interlayer 391, a pixel electrode PE, a light blocking portion 376, and a short circuit portion 600.

The switching element TFT includes a gate electrode GE, a semiconductor layer 313, an ohmic contact layer 315, a source electrode SE, and a drain electrode DE.

The gate line GL, the gate electrode GE, and the common line 166 are disposed on the first substrate 301. Although not shown in the drawings, an end portion of the gate line GL may be connected to another layer or an external driving circuit, and to this end, the end portion of the gate line GL may have a larger planar area than that of another portion thereof.

In an exemplary embodiment, at least one of the gate line GL, the gate electrode GE, and the common line 166 may include or consist of aluminum (Al) or alloys thereof, silver (Ag) or alloys thereof, copper (Cu) or alloys thereof, and/or molybdenum (Mo) or alloys thereof, for example. In an alternative exemplary embodiment, at least one of the gate line GL, the gate electrode GE, and the common line 166 may include or consist of one of chromium (Cr), tantalum (Ta), and titanium (Ti), for example. In an alternative exemplary embodiment, at least one of the gate line GL, the gate electrode GE, and the common line 166 may have a multilayer structure including at least two conductive layers that have different physical properties from one another, for example. Although the gate electrode GE is unitary with the gate line GL in the illustrated exemplary embodiment, the invention is not limited thereto, and the gate electrode GE and the gate line GL may be provided separately and then connected to each other.

In an exemplary embodiment, the gate insulating layer 311 is disposed on the gate line GL, the gate electrode GE, and the common line 166. In the exemplary embodiment, the gate insulating layer 311 may be disposed over an entire surface of the first substrate 301 on which the gate line GL, the gate electrode GE, and the common line 166 are disposed. As illustrated in FIG. 7, an aperture is defined in the gate insulating layer 311 corresponding to a common contact hole 35. The common line 166 is exposed through the common contact hole 35.

In an exemplary embodiment, the gate insulating layer 311 may include or consist of silicon nitride (SiNx) or silicon oxide (SiOx), for example. The gate insulating layer 311 may have a multilayer structure including at least two insulating layers having different physical properties.

The semiconductor layer 313 is disposed on the gate insulating layer 311. The semiconductor layer 313 overlaps the gate electrode GE, the source electrode SE, and the drain electrode DE. The semiconductor layer 313 may include amorphous silicon, polycrystalline silicon, or the like.

The ohmic contact layer 315 is disposed on the semiconductor layer 313. In an exemplary embodiment, the ohmic contact layer 315 may include silicide or n+ hydrogenated amorphous silicon doped with n-type impurities, e.g., phosphorus (P), at high concentration. The ohmic contact layers 315 may be disposed on the semiconductor layer 313 in pairs.

The source electrode SE is disposed on a portion of the ohmic contact layer 315 contacting a portion of the semiconductor layer 313. The source electrode SE extends from the data line DL. In an exemplary embodiment, as illustrated in FIG. 6, the source electrode SE has a shape protruding from the data line DL toward the gate electrode GE, for example. Although the source electrode SE is unitary with the data line DL in the illustrated exemplary embodiment, the invention is not limited thereto, and the source electrode SE and the data line DL may be provided separately and then connected to each other. The source electrode SE overlaps the semiconductor layer 313 and the gate electrode GE.

In an exemplary embodiment, the source electrode SE may include or consist of refractory metal, such as molybdenum, chromium, tantalum, and titanium, or an alloy thereof, and may have a multilayer structure including a refractory metal layer and a low-resistance conductive layer. Examples of the multilayer structure may include a double-layer structure including a chromium or molybdenum (alloy) lower layer and an aluminum (alloy) upper layer, and a triple-layer structure including a molybdenum (alloy) lower layer, an aluminum (alloy) intermediate layer, and a molybdenum (alloy) upper layer. In an alternative exemplary embodiment, the source electrode SE may include or consist of any suitable metals or conductors rather than the aforementioned materials.

The drain electrode DE is disposed on a portion of the ohmic contact layer 315 contacting another portion of the semiconductor layer 313. The drain electrode DE overlaps the gate electrode GE and the semiconductor layer 313. The drain electrode DE is connected to the pixel electrode PE. The drain electrode DE may include the same material and have the same structure (e.g., a multilayer structure) as those of the source electrode SE. In other words, the drain electrode DE and the source electrode SE may be simultaneously provided in the same process.

A channel area of the switching element TFT is disposed in a portion of the semiconductor layer 313 between the source electrode SE and the drain electrode DE. In an exemplary embodiment, the portion of the semiconductor layer 313 corresponding to the channel area has a less thickness than that of another portion thereof in a vertical direction of FIG. 8A.

The data line DL is disposed on the gate insulating layer 311. In an exemplary embodiment, although not illustrated, an end portion of the data line DL may be connected to another layer or an external driving circuit, and to this end, the end portion of the data line DL may have a larger planar area than that of another portion thereof.

The data line DL intersects the gate line GL. In an exemplary embodiment, although not illustrated, a portion of the data line DL intersecting the gate line GL may have a smaller line width than that of another portion of the data line DL in a horizontal direction in FIG. 6, for example. Accordingly, a parasitic capacitance between the data line DL and the gate line GL may be reduced. The data line DL may include the same material and have the same structure (e.g., a multilayer structure) as those of the source electrode SE. In other words, the data line DL and the source electrode SE may be simultaneously provided in the same process.

In an exemplary embodiment, the semiconductor layer 313 may further be disposed between the gate insulating layer 311 and the source electrode SE. In addition, the semiconductor layer 313 may further be disposed between the gate insulating layer 311 and the drain electrode DE. Herein, a portion of the semiconductor layer 313 between the gate insulating layer 311 and the source electrode SE is referred to as a first additional semiconductor layer, and a portion of the semiconductor layer 313 between the gate insulating layer 311 and the drain electrode DE is referred to as a second additional semiconductor layer. In the exemplary embodiment, the aforementioned ohmic contact layer 315 may further be disposed between the first additional semiconductor layer and the source electrode SE, and the aforementioned ohmic contact layer 315 may further be disposed between the second additional semiconductor layer and the drain electrode DE.

In an exemplary embodiment, although not illustrated, the semiconductor layer 313 may further be disposed between the gate insulating layer 311 and the data line DL. In an exemplary embodiment, the semiconductor layer 313 may further be disposed between the gate insulating layer 311 and the data line DL, for example. Herein, a portion of the semiconductor layer 313 between the gate insulating layer 311 and the data line DL is referred to as a third additional semiconductor layer. In the exemplary embodiment, the aforementioned ohmic contact layer 315 may further be disposed between the third additional semiconductor layer and the data line DL.

In an exemplary embodiment, the passivation layer 320 is disposed on the data line DL, the source electrode SE, the drain electrode DE, and the gate insulating layer 311. In the exemplary embodiment, the passivation layer 320 may be disposed over an entire surface of the first substrate 301 on which the data line DL, the source electrode SE, the drain electrode DE, and the gate insulating layer 311 are disposed. As illustrated in FIG. 7, apertures are defined in the passivation layer 320 corresponding to a drain contact hole 32 and the common contact hole 35. The drain electrode DE is exposed through the drain contact hole 32.

In an exemplary embodiment, the passivation layer 320 may include an inorganic insulating material such as silicon nitride ($SiN_x$) or silicon oxide ($SiO_x$), and in the exemplary embodiment, an inorganic insulating material having photosensitivity and having a dielectric constant of about 4.0 may be used, for example. In an alternative exemplary embodiment, the passivation layer 320 may have a double-layer structure including a lower inorganic layer and an upper organic layer, which is found to impart excellent insulating characteristics and does not damage an exposed portion of the semiconductor layer 313. In an exemplary embodiment, the passivation layer 320 may have a thickness greater than or equal to about 5000 angstroms (Å), e.g., in a range of about 6000 Å to about 8000 Å.

The color filter 354 is disposed on the passivation layer 320 in a pixel area. In an exemplary embodiment, the color filter 354 is disposed corresponding to the second aperture 36b of the light blocking portion 376, and in the exemplary embodiment, an edge portion of the color filter 354 may be disposed on the gate line GL, the switching element TFT, and the data line DL. An edge portion of one of the color filters 354 may overlap an edge portion of another of the color filters 354 that is adjacent thereto. An aperture is defined in the color filter 354 corresponding to the drain electrode DE. In an exemplary embodiment, the color filter 354 may include or consist of a photosensitive organic material, for example.

In an exemplary embodiment, the insulating interlayer 391 is disposed on the color filter 354 and the passivation layer 320. In the exemplary embodiment, the insulating interlayer 391 may be disposed over the entire surface of the first substrate 301 on which the color filter 354 and the passivation layer 320 are disposed. As illustrated in FIG. 7, apertures may be defined in the insulating interlayer 391 corresponding to the drain contact hole 32 and the common contact hole 35, respectively. The insulating interlayer 391 may include or consist of an organic material.

The pixel electrode PE is connected to the drain electrode DE through the drain contact hole 32. The pixel electrode PE is disposed on the insulating interlayer 391. The pixel electrode PE is disposed corresponding to the second aperture 36b of the light blocking portion 376, and a portion of the pixel electrode PE may overlap the light blocking portion 376 which defines the second aperture 36b. In an exemplary embodiment, the pixel electrode PE may include or consist of a transparent conductive material, such as indium tin oxide ("ITO") or indium zinc oxide ("IZO"). In the exemplary embodiment, ITO may be a polycrystalline or monocrystalline material, and IZO may be a polycrystalline or monocrystalline material, for example.

The light blocking portion 376 is disposed on the pixel electrode PE and the insulating interlayer 391. As described above, the light blocking portion 376 includes the first aperture 36a and the second aperture 36b.

The short circuit portion 600 includes a protruding portion 601 and a short circuit electrode 602. The protruding portion 601 is disposed on the common line 166, and the short circuit electrode 602 is disposed on the common line 166 and the protruding portion 601.

The protruding portion 601 may include a plurality of protrusion patterns respectively disposed on different layers. In an exemplary embodiment, as illustrated in FIG. 7, the protruding portion 601 may include first, second, third, and fourth protrusion patterns 611a, 611b, 611c, and 611d that are stacked vertically, for example.

In an exemplary embodiment, the first, second, third, and fourth protrusion patterns 611a, 611b, 611c, and 611d included in the protruding portion 601 may include different materials from one another, for example.

The first protrusion pattern 611a is disposed on the common line 166. The first protrusion pattern 611a may be disposed on the same layer as a layer on which the gate insulating layer 311 is disposed. The first protrusion pattern 611a and the gate insulating layer 311 may be simultaneously provided using the same material.

The second protrusion pattern 611b is disposed on the first protrusion pattern 611a. The second protrusion pattern 611b may be disposed on the same layer as a layer on which the passivation layer 320 is disposed. The second protrusion pattern 611b and the passivation layer 320 may be simultaneously provided using the same material.

The third protrusion pattern 611c is disposed on the second protrusion pattern 611b. The third protrusion pattern 611c may be disposed on the same layer as a layer on which the color filter 354 is disposed. The third protrusion pattern 611c and the color filter 354 may be simultaneously provided using the same material.

In an exemplary embodiment, the third protrusion pattern 611c may include the same material as a material included in one of a red color filter, a green color filter, and a blue color filter. In the exemplary embodiment, the third protrusion pattern 611c may include the same material as that included in a color filter having a lowest light transmittance. In an exemplary embodiment, the third protrusion pattern 611c may include the same material as that included in the blue color filter, for example. In an exemplary embodiment, the third protrusion pattern 611c may include the same material as that included in a color filter having a largest thickness in a vertical direction in FIG. 7. In an exemplary embodiment, in a case where the blue color filter has a largest thickness, the third protrusion pattern 611c may include the same material as that included in the blue color filter, for example.

The fourth protrusion pattern 611d is disposed on the second protrusion pattern 611b and the third protrusion pattern 611c. The fourth protrusion pattern 611d may be disposed on the same layer as a layer on which the insulating interlayer 391 is disposed. The fourth protrusion pattern 611d and the insulating interlayer 391 may be simultaneously provided using the same material. In an exemplary embodiment, the fourth protrusion pattern 611d may not be provided in the second protrusion pattern 611b. In an alternative exemplary embodiment, the fourth protrusion pattern 611d may be omitted.

In an exemplary embodiment, the short circuit electrode 602 is disposed on the common line 166 and the fourth protrusion pattern 611d. In the exemplary embodiment, the short circuit electrode 602 is connected to the common line 166 through the common contact hole 35. The short circuit electrode 602 is connected to the common electrode 330 through a conductive ball 700 included in the sealing portion 155. The short circuit electrode 602 may include the same material as that included in the pixel electrode PE.

At least a portion of the short circuit portion 600 having such a configuration includes a darkened area (or a carbonized area). In other words, at least one of the first, second, third, and fourth protrusion patterns 611a, 611b, 611c, and 611d of the short circuit portion 600 may include a darkened area. In an exemplary embodiment, as illustrated in FIG. 7, the third protrusion pattern 611c of the short circuit portion 600 may include a darkened area, for example. In an exemplary embodiment, although not illustrated, at least one of the first protrusion pattern 611a, the second protrusion pattern 611b, and the fourth protrusion pattern 611d may include the darkened area.

A light transmittance of the darkened area is lower than that of the color filter 354 and higher than that of the light blocking portion 376.

In a case where the first protrusion pattern 611a includes the darkened area, the first protrusion pattern 611a may further include the same material as that included in the gate insulating layer 311.

In a case where the second protrusion pattern 611b includes the darkened area, the second protrusion pattern 611b may further include the same material as that included in the passivation layer 320.

In a case where the third protrusion pattern 611c includes the darkened area, the third protrusion pattern 611c may include the same material as that included in the color filter 354. In an exemplary embodiment, the third protrusion pattern 611c including the darkened area may further include the same material as that included in one of the red color filter, the green color filter, and the blue color filter, for example.

In a case where the fourth protrusion pattern 611d includes the darkened area, the fourth protrusion pattern 611d may further include the same material as that included in the insulating interlayer 391.

As such, in a case where at least a portion of the protruding portion 601 includes the darkened area, reflected light may be effectively reduced in the short circuit portion 600. That is, the common line 166 including a metal material is disposed between the short circuit portion 600 and the first substrate 301, and light externally incident to the common line 166 may be reflected outwards by the common line 166. The short circuit portion 600 may be recognized by the reflected light. In an exemplary embodiment, in a case where the third protrusion pattern 611c of the short circuit portion 600 includes the same material as that included in the blue color filter, blue light is generated in the non-display area such that image quality may be degraded, for example. However, the darkened area of the protruding portion 601 significantly reduces reflected light in the short circuit portion 600 such that the short circuit portion 600 may be significantly less recognized.

FIGS. 8A, 8B, 8C, 8D, and 8E are cross-sectional views illustrating a process of manufacturing an exemplary embodiment of an LCD device.

Figure 8A:
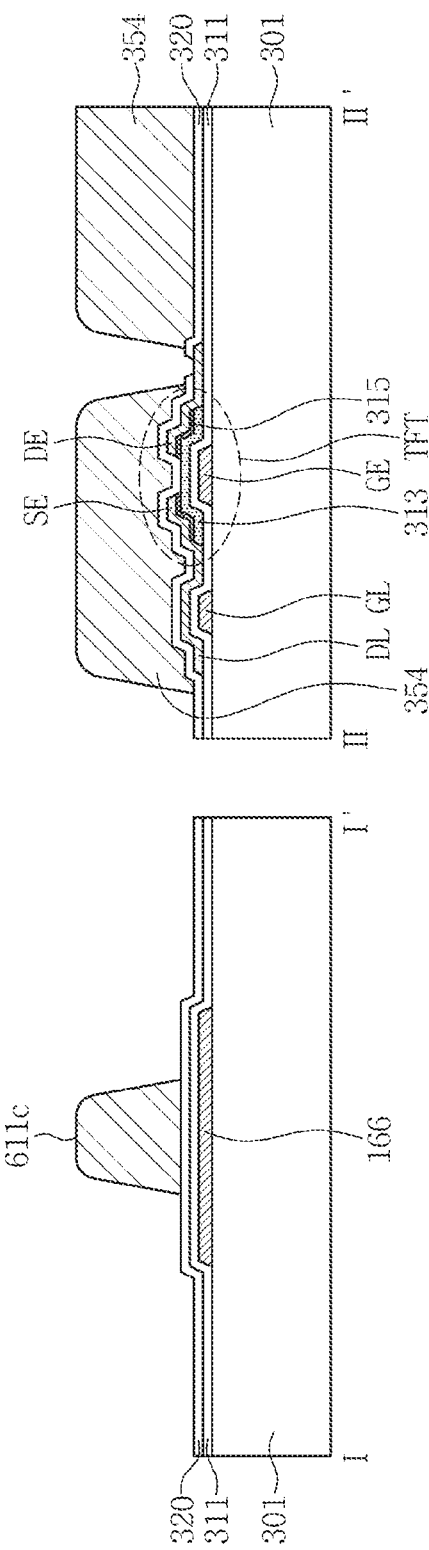
FIGS. 8A, 8B, 8C, 8D, and 8E are cross-sectional views illustrating a process of manufacturing an exemplary embodiment of an LCD device.

As illustrated in FIG. 8A, a common line 166, a gate line GL, and a gate electrode GE are disposed on a first substrate 310. Subsequently, a gate insulating layer 311 is disposed over an entire surface of the first substrate 301 on which the common line 166, the gate line GL, and the gate electrode GE are disposed. Subsequently, a semiconductor layer 313 and an ohmic contact layer 315 overlapping the gate electrode GE are disposed on the gate insulating layer 311. Subsequently, a source electrode SE and a drain electrode DE are disposed on the ohmic contact layer 315 and the gate insulating layer 311. Subsequently, in the state that the source electrode SE and the drain electrode DE are used as a mask, the ohmic contact layer 315 is removed such that a channel area of a switching element TFT is defined. Subsequently, a passivation layer 320 is disposed over the entire surface of the first substrate 301. Subsequently, a third protrusion pattern 611c and a color filter 354 are disposed on the passivation layer 320. The third protrusion pattern 611c overlaps the common line 166.

Figure 8B:
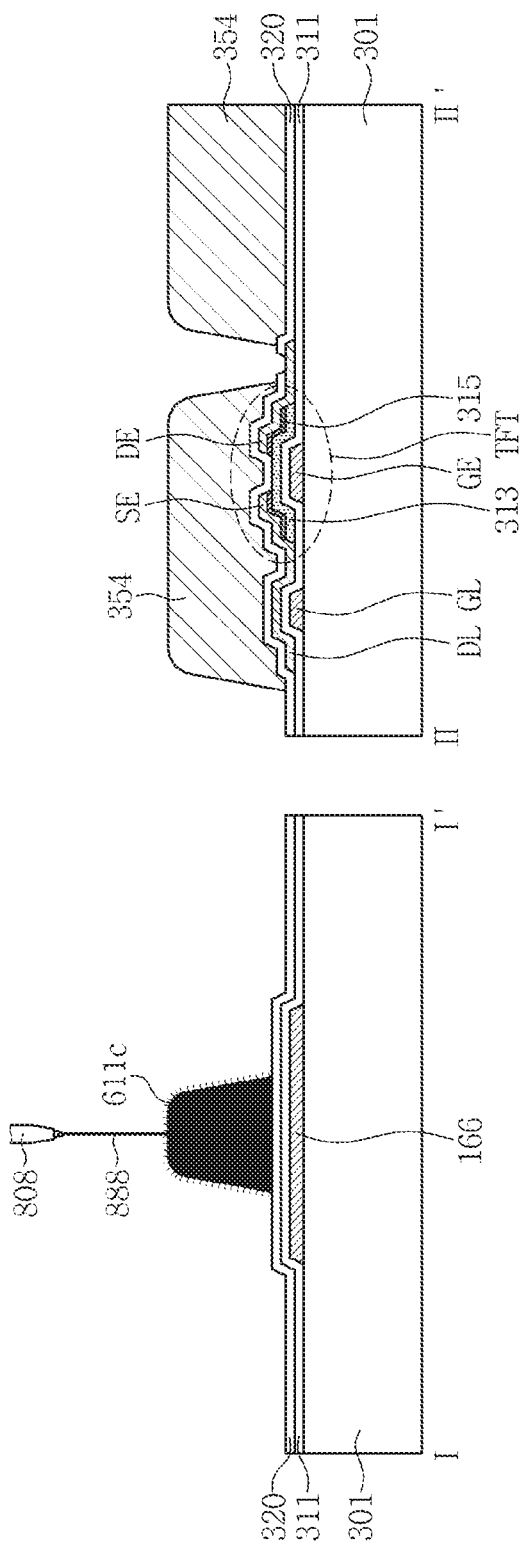

Subsequently, as illustrated in FIG. 8B, an intense light 888 (e.g., a laser beam) is irradiated from a light emitting apparatus 808 (e.g., laser beam emitting apparatus) to the third protrusion pattern 611c. The third protrusion pattern 611c is carbonized by the intense light 888, and thus a darkened area is provided on the third protrusion pattern 611c. Accordingly, the third protrusion pattern 611c includes a darkened area.

Figure 8C:
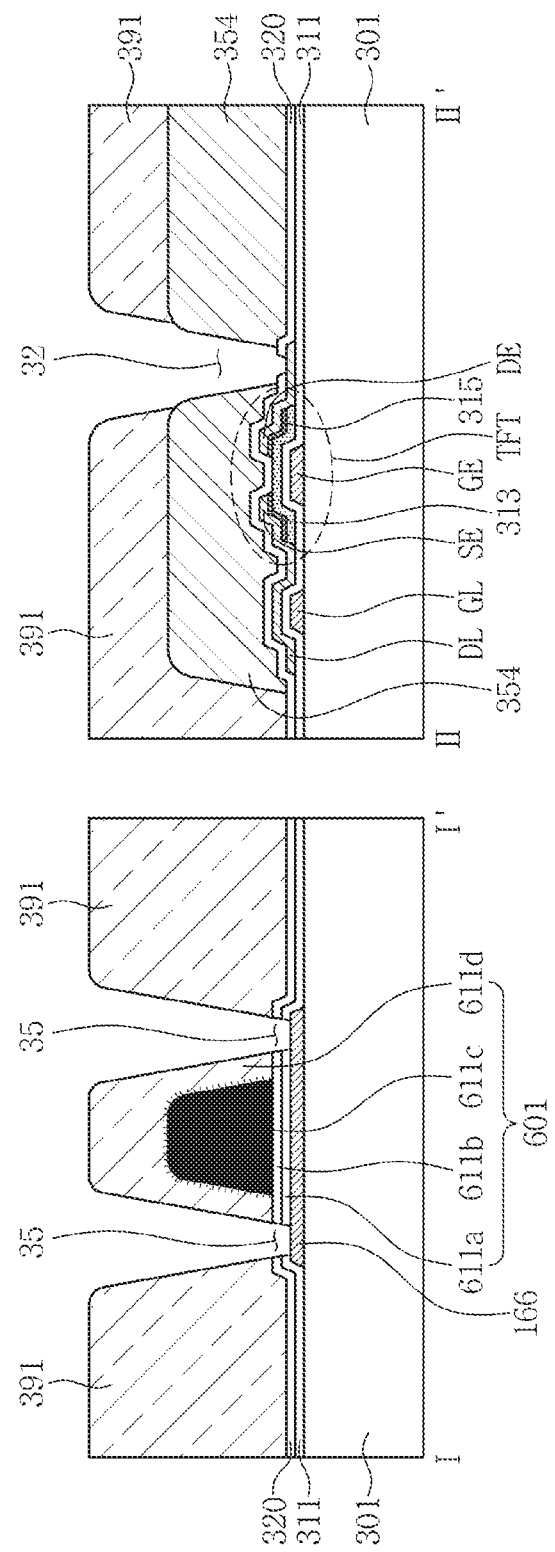

Subsequently, as illustrated in FIG. 8C, an insulating interlayer 391 and a fourth protrusion pattern 611d in which apertures are defined corresponding to the drain electrode DE and the common line 166 are disposed on the passivation layer 320, the third protrusion pattern 611c, and the color filter 354. Subsequently, in the state where the insulating interlayer 391 and the fourth protrusion pattern 611d are used as a mask, the passivation layer 320 and the gate insulating layer 311 are removed such that a common contact hole 35 and a drain contact hole 32 are defined. In addition, a portion of the passivation layer 320 and the gate insulating layer 311 are removed such that a first protrusion pattern 611a and a second protrusion pattern 611b are provided.

Figure 8D:
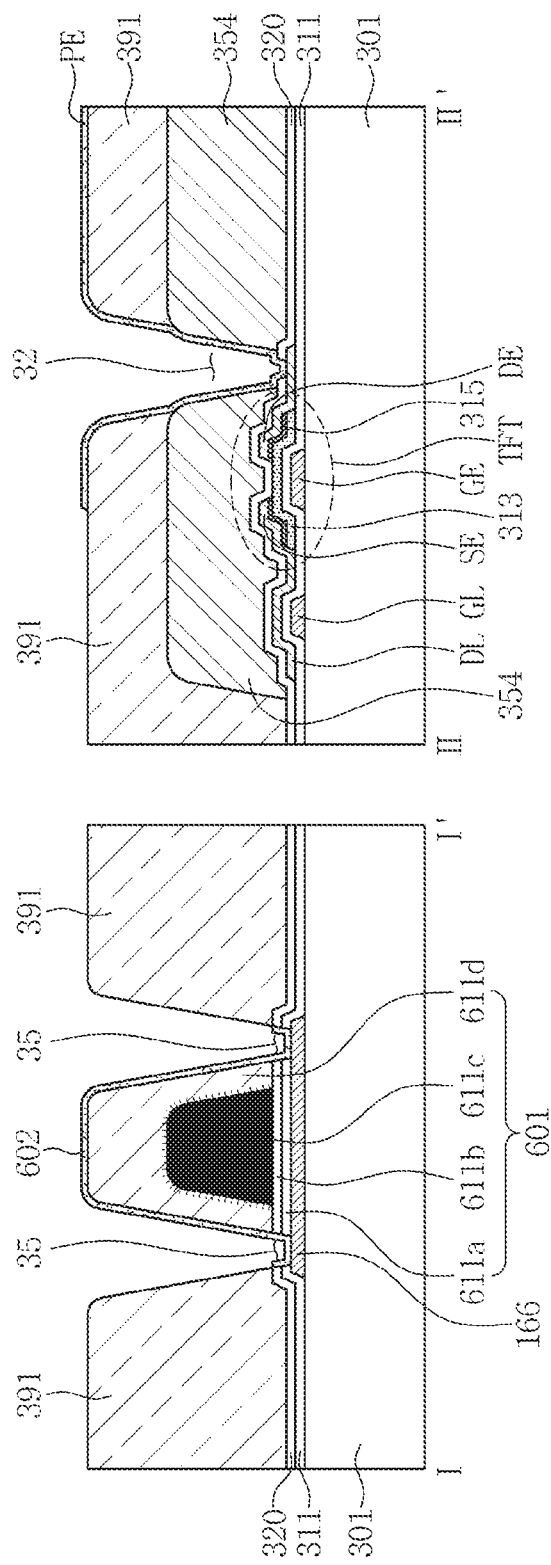

Subsequently, as illustrated in FIG. 8D, a short circuit electrode 602 is disposed on the common line 166 and the fourth protrusion pattern 611d, and a pixel electrode PE is disposed on the drain electrode DE and the insulating interlayer 391.

Figure 8E:
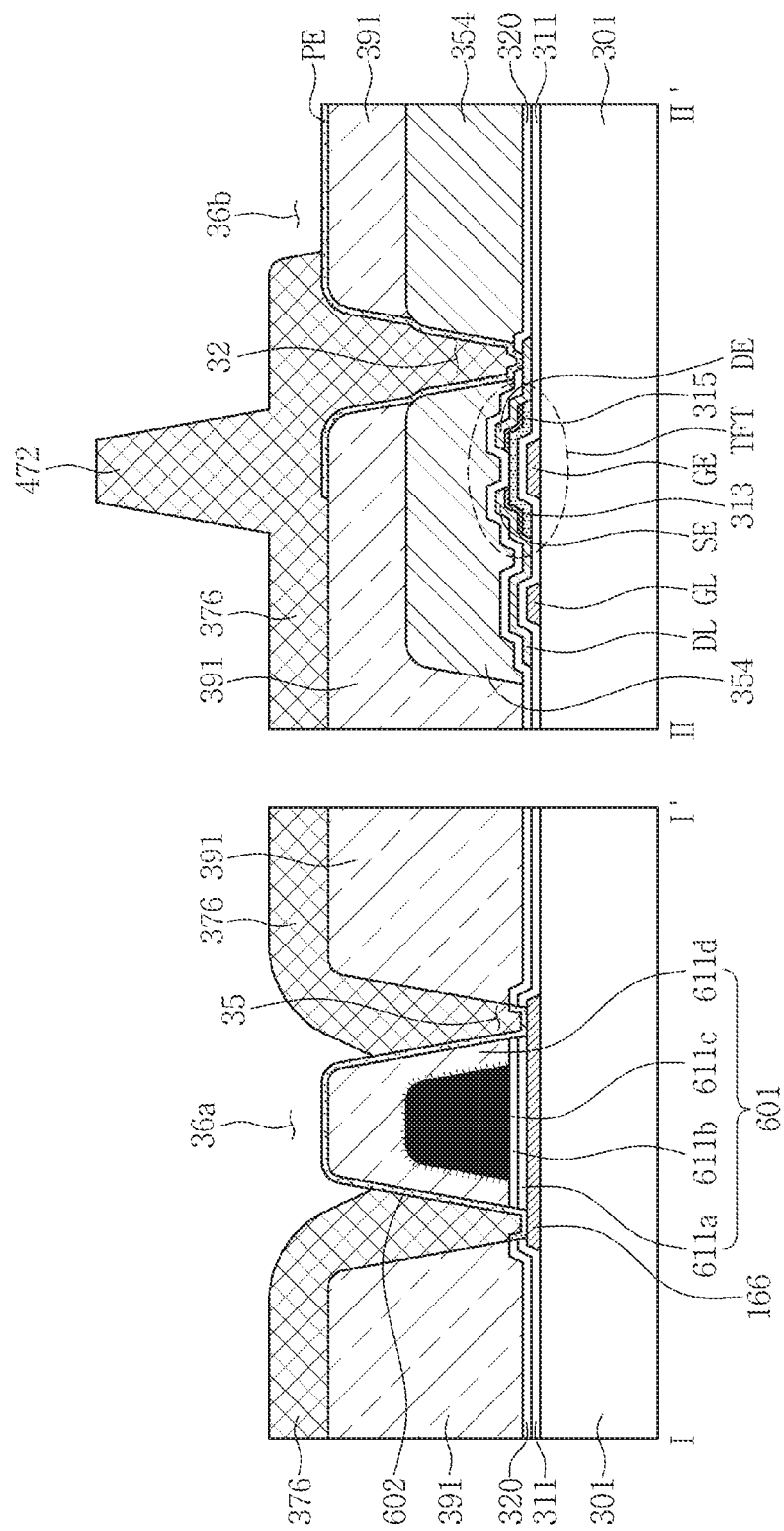

Subsequently, as illustrated in FIG. 8E, a light blocking portion 376 and a column spacer 472 are disposed on portions except for a short circuit area and a pixel area. A first aperture 36a and a second aperture 36b are defined in the light blocking portion 376.

Figure 9:
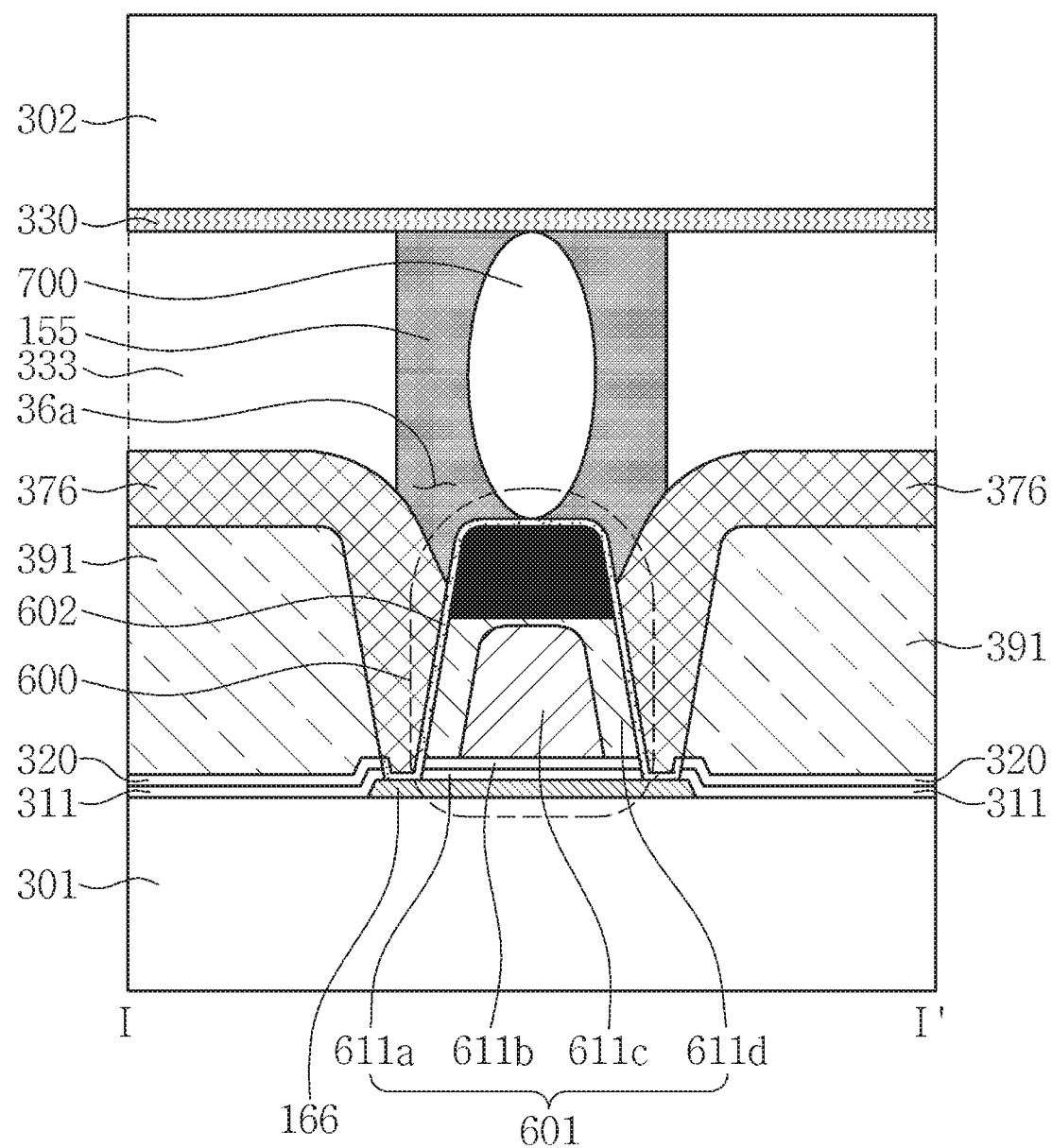
FIG. 9 is a cross-sectional view illustrating an exemplary embodiment taken along line I-I' of FIG. 5.

FIG. 9 is a cross-sectional view illustrating an exemplary embodiment taken along line I-I' of FIG. 5.

As illustrated in FIG. 9, a fourth protrusion pattern 611d, among first, second, third, and fourth protrusion patterns 611a, 611b, 611c, and 611d, may include a darkened area. In an exemplary embodiment, an upper portion of the fourth protrusion pattern 611d may include a darkened area to overlap the third protrusion pattern 611c. The fourth protrusion pattern 611d may be carbonized by an intense light 888 (refer to FIG. 8B) in the above described manner and thus may have the darkened area, for example. In an exemplary embodiment, the fourth protrusion pattern 611d may be irradiated with the intense light 888 in the aforementioned process of FIG. 8C, for example.

Figure 10:
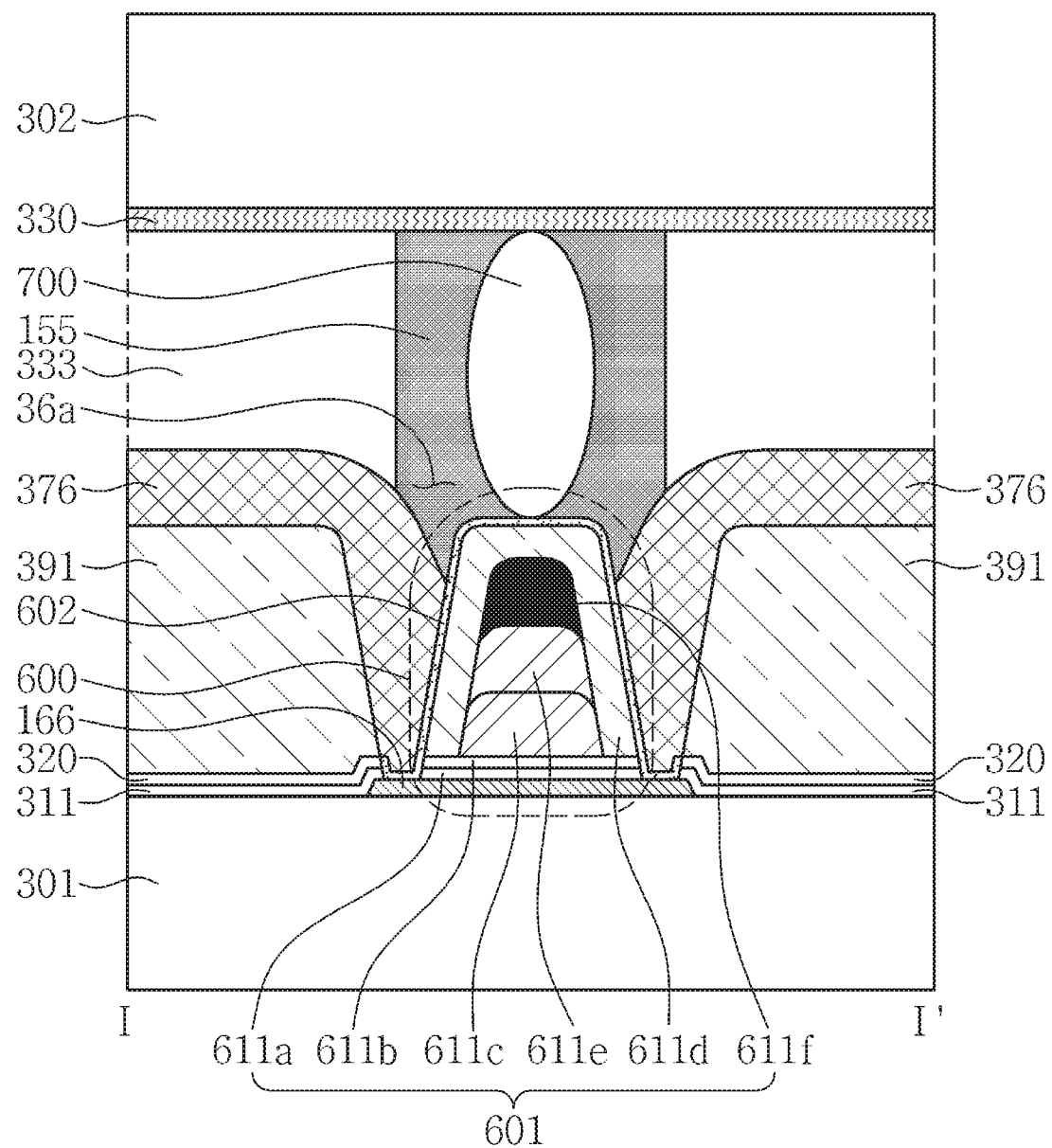
FIG. 10 is a cross-sectional view illustrating an alternative exemplary embodiment taken along line I-I' of FIG. 5.

FIG. 10 is a cross-sectional view illustrating an alternative exemplary embodiment taken along line I-I' of FIG. 5.

As illustrated in FIG. 10, a short circuit portion 600 may further include at least one of a fifth protrusion pattern 611e and a sixth protrusion pattern 611f. The fifth protrusion pattern 611e is disposed on the third protrusion pattern 611c, and the sixth protrusion pattern 611f is disposed on the fifth protrusion pattern 611e.

The third protrusion pattern 611c, the fifth protrusion pattern 611e, and the sixth protrusion pattern 611f may include materials of different color filters, respectively. In an exemplary embodiment, the third protrusion pattern 611c includes the same material as that included in a red color filter, the fifth protrusion pattern 611e includes the same material as that included in a green color filter, and the sixth protrusion pattern 611f includes the same material as that included in a blue color filter, for example.

At least one of the first, second, third, fourth, fifth, and sixth protrusion patterns 611a, 611b, 611c, 611d, 611e, and 611f may include a darkened area, and FIG. 10 illustrates an example in which the sixth protrusion pattern 611f includes a darkened area.

Figure 11:
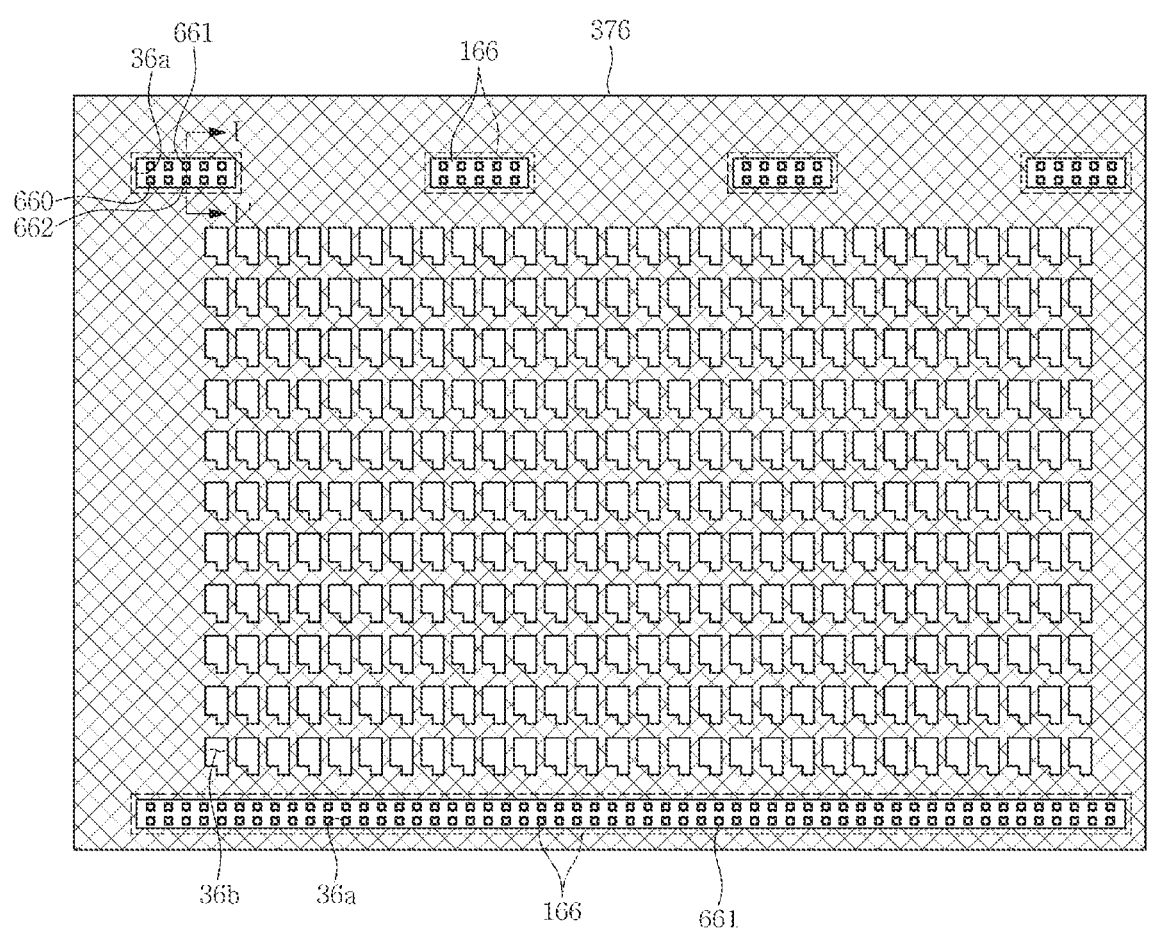
FIG. 11 is a view illustrating an alternative exemplary embodiment of a short circuit portion in the first aperture of the light blocking portion of FIG. 4 and a common line below the short circuit portion.
Figure 12:
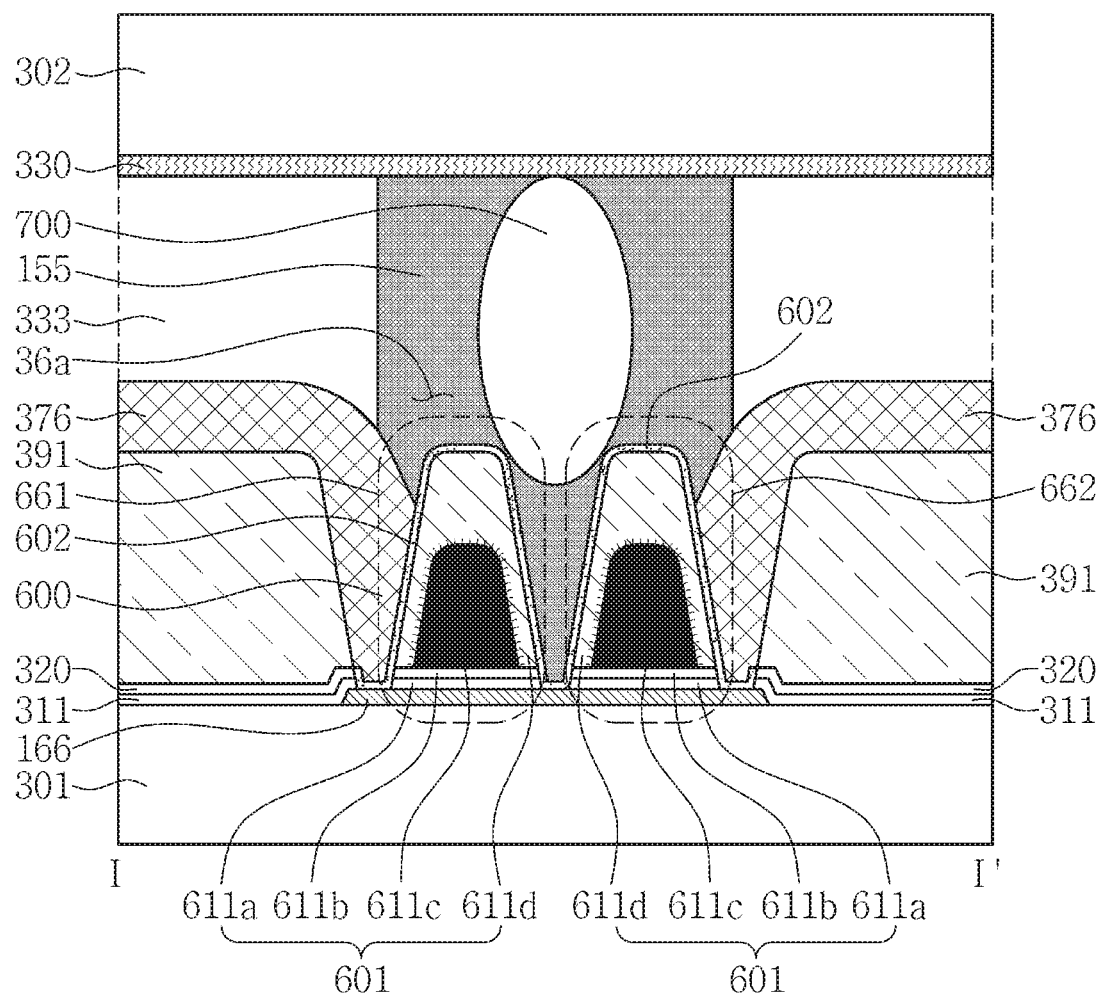
FIG. 12 is a cross-sectional view taken along line I-I' of FIG. 11.

FIG. 11 is a view illustrating an alternative exemplary embodiment of a short circuit portion 660 in the first aperture 36a of the light blocking portion 376 of FIG. 4 and a common line 166 below the short circuit portion 660, and FIG. 12 is a cross-sectional view taken along line I-I' of FIG. 11.

As illustrated in FIG. 11, a plurality of short circuit portions 660 may be disposed in a short circuit area defined by a single first aperture 36a.

Each of the short circuit portions 660 has the same configuration as that of the aforementioned short circuit portion 600. In an exemplary embodiment, in a case where two short circuit portions that are adjacent to each other among the plurality of short circuit portions 660 are respectively referred to as a first short circuit portion 661 and a second short circuit portion 662, the first short circuit portion 661 includes a protruding portion 601 and a short circuit electrode 602, and the second short circuit portion 662 also includes a protruding portion 601 and a short circuit electrode 602, for example.

The respective protruding portions 601 of the short circuit portions 660 are disposed on different portions of the common line 166.

The respective protruding portions 601 of the short circuit portions 660 are separated from one another. In an exemplary embodiment, the protruding portion 601 of the first short circuit portion 661 and the protruding portion 601 of the second short circuit portion 662 are separated from each other, for example.

The respective short circuit electrodes 602 of the short circuit portions 660 are connected to one another. In detail, the respective short circuit electrodes 602 of the short circuit portions 660 are unitary. In an exemplary embodiment, the short circuit electrode 602 of the first short circuit portion 661 and the short circuit electrode 602 of the second short circuit portion 662 are unitary, for example.

The respective protruding portions 601 of the short circuit portions 660 may include a plurality of protrusion patterns that are stacked vertically as described above. In an exemplary embodiment, the protruding portion 601 of the first short circuit portion 661 may include first, second, third, and fourth protrusion patterns 611a, 611b, 611c, and 611d, and the protruding portion 601 of the second circuit portion 662 may also include first, second, third, and fourth protrusion patterns 611a, 611b, 611c, and 611d, for example.

As such, as the plurality of protruding portions is separated from one another in a single short circuit area, one protruding portion illustrated in FIG. 11 has a smaller size than that of the protruding portion illustrated in FIG. 7. In an exemplary embodiment, according to the structure illustrated in FIG. 11, an empty space is defined in an area where the protruding portion is absent among respective ones of the protruding portions, and thus a total area of respective areas of the plurality of protruding portions 601 disposed in a single short circuit area (hereinafter, a first short circuit area) illustrated in FIG. 11 is smaller than a planar area of a single protruding portion 601 disposed in a single short circuit area (a short circuit area having the same planar area as that of the first short circuit area) illustrated in FIG. 7. Accordingly, an amount of reflected light may further be reduced in the configuration of FIG. 11 than that of FIG. 7.

At least a portion of each short circuit portion 660 may include a darkened area. In an exemplary embodiment, at least a portion of the first short circuit portion 661 and at least a portion of the second short circuit portion 662 may include darkened areas, for example. In the exemplary embodiment, as described above, at least one of the first, second, third, and fourth protrusion patterns 611a, 611b, 611c, and 611d of the first short circuit portion 661 may include the darkened area, and at least one of the first, second, third, and fourth protrusion patterns 611a, 611b, 611c, and 611d of the second short circuit portion 662 may include the darkened area.

A light transmittance of the darkened area is lower than that of the color filter 354 and higher than that of the light blocking portion 376.

In addition, at least one short circuit portion 600 included in a single short circuit area may include a darkened area. In addition, some of the short circuit portions of the plurality of short circuit portions 600 included in the single short circuit area may each include a darkened area, while other short circuit portions may not include a darkened area.

In a case where at least one of the plurality of short circuit portions 600 in the single short circuit area includes the aforementioned darkened area, the aforementioned reflected light may further be reduced.

Figure 13:
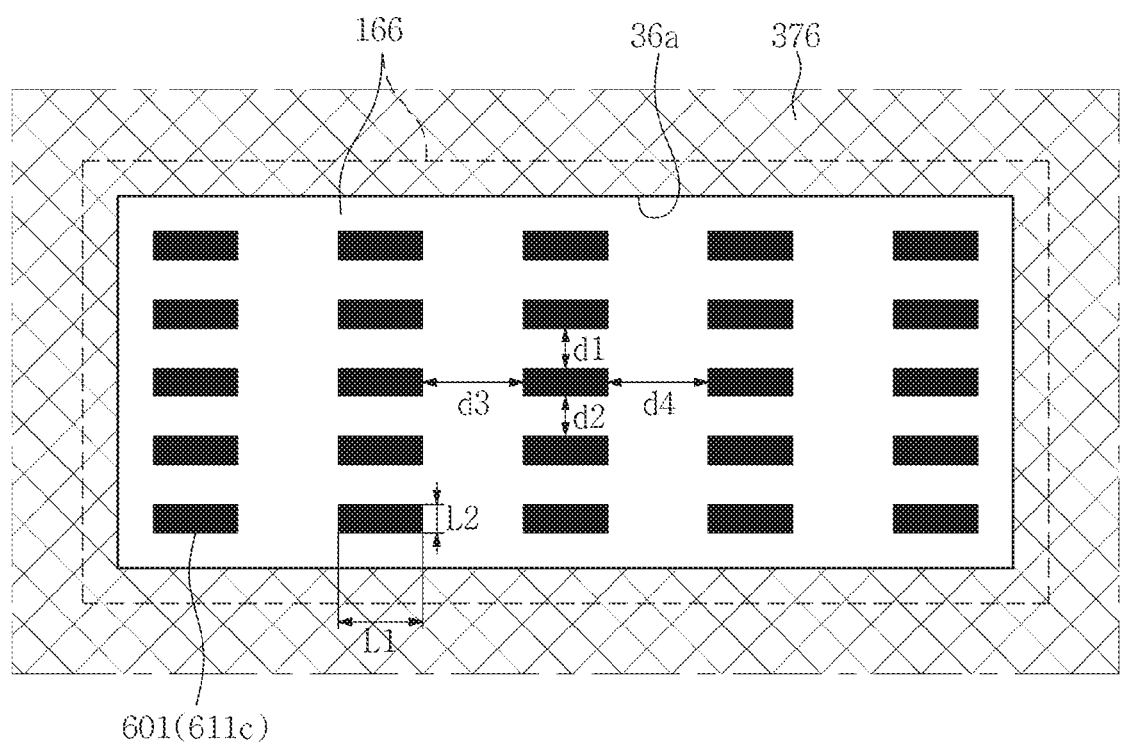
FIG. 13 is a view illustrating an exemplary embodiment of a plurality of protruding portions in a single short circuit area of FIG. 4.

FIG. 13 is a view illustrating an exemplary embodiment of a plurality of protruding portions 601 in a single short circuit area of FIG. 4.

As illustrated in FIG. 13, each of the protruding portions 601 may have a rectangular shape, for example. In an exemplary embodiment, the third protrusion pattern 611c of the first, second, third, and fourth protrusion patterns 611a, 611b, 611c, and 611d in the protruding portion 601 may have a rectangular shape, for example. In other words, each of the third protrusion patterns 611c including the same material as that included in the color filter 354 may each have a rectangular shape.

In a case where the protruding portion 601 has a rectangular shape or a square shape, sides L1 and L2 of the protruding portion 601 may each have a length of at least about 20 micrometers (μm), for example. In an exemplary embodiment, in a case where the third protrusion pattern 611c has a rectangular shape or a square shape, a length of each side of the third protrusion pattern 611c may be at least about 20 μm, for example.

In an exemplary embodiment, distances d1, d2, d3, and d4 among adjacent ones of the protruding portions 601 may be at least about 10 μm, for example. In an exemplary embodiment, a distance among adjacent ones of the third protrusion patterns 611c may be at least about 10 μm, for example.

Figure 14:
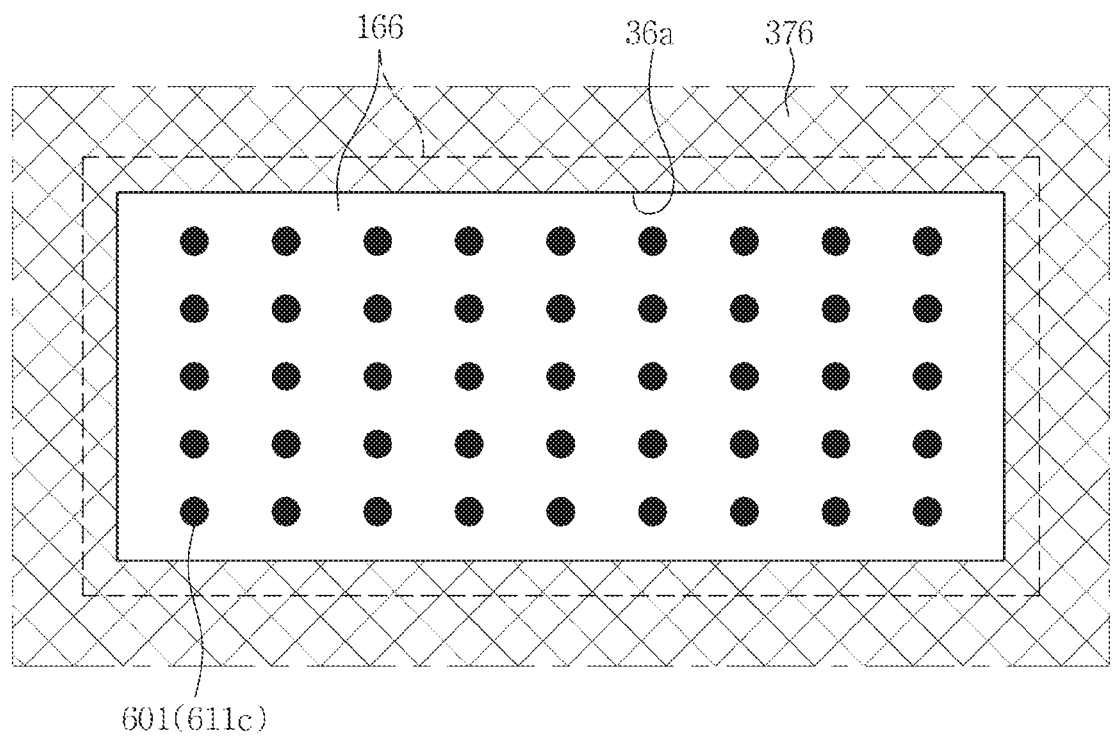
FIG. 14 is a view illustrating an alternative exemplary embodiment of a plurality of protruding portions in a single short circuit area of FIG. 4.

FIG. 14 is a view illustrating an alternative exemplary embodiment of a plurality of protruding portions 601 in a single short circuit area of FIG. 4.

As illustrated in FIG. 14, each of the protruding portions 601 may have a circular shape. In an exemplary embodiment, the third protrusion pattern 611c of the first, second, third, and fourth protrusion patterns 611a, 611b, 611c, and 611d may have a circular shape, for example. In other words, each of the third protrusion patterns 611c including the same material as that included in the color filter 354 may have a circular shape.

In an exemplary embodiment, although not illustrated, the respective third protrusion pattern 611c of the protruding portions 601 may have various other shapes including a square shape or an elliptical shape, for example.

Figure 15:
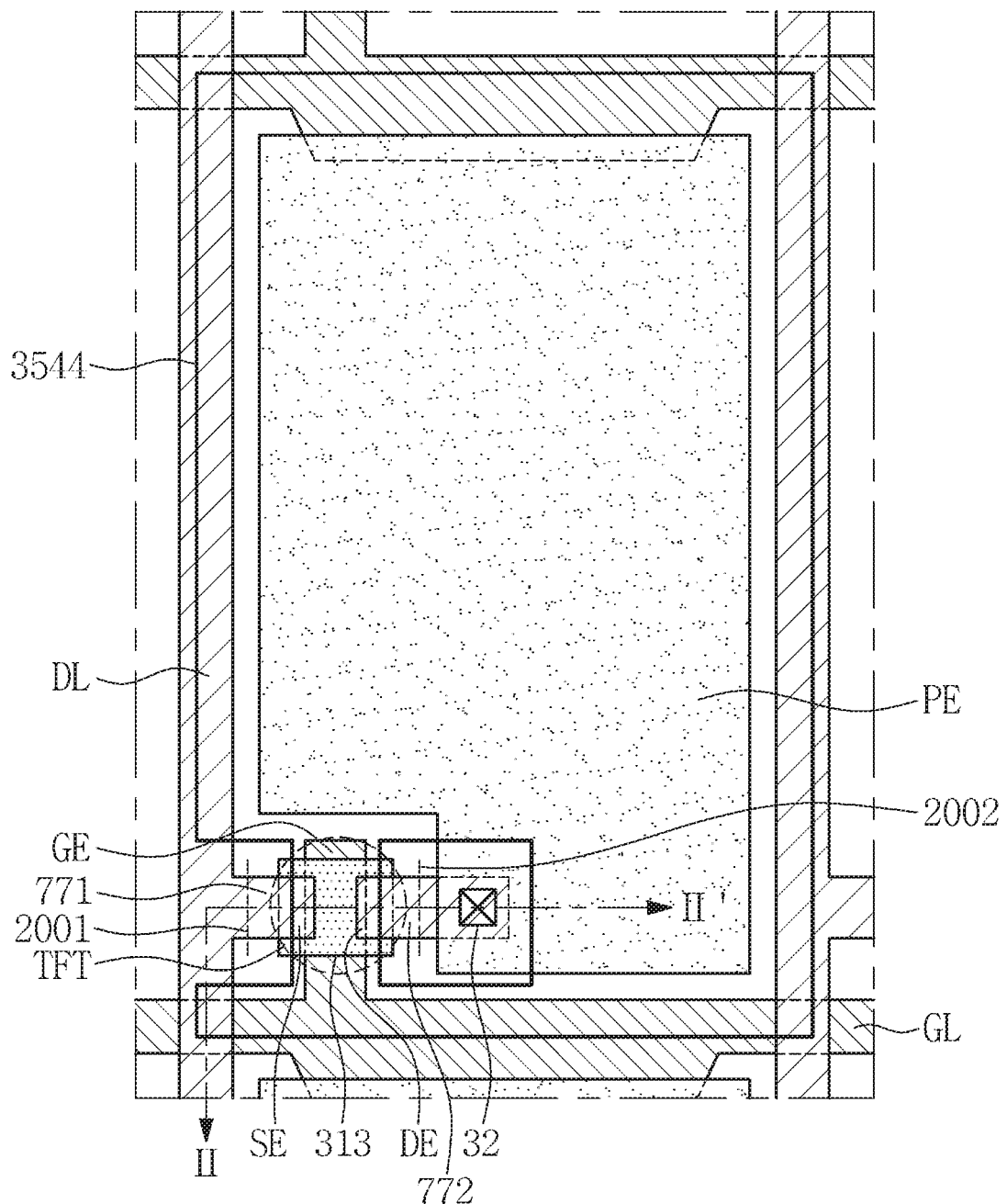
FIG. 15 is a plan view illustrating an alternative exemplary embodiment of a pixel corresponding to a single pixel area of FIG. 5.
Figure 16:
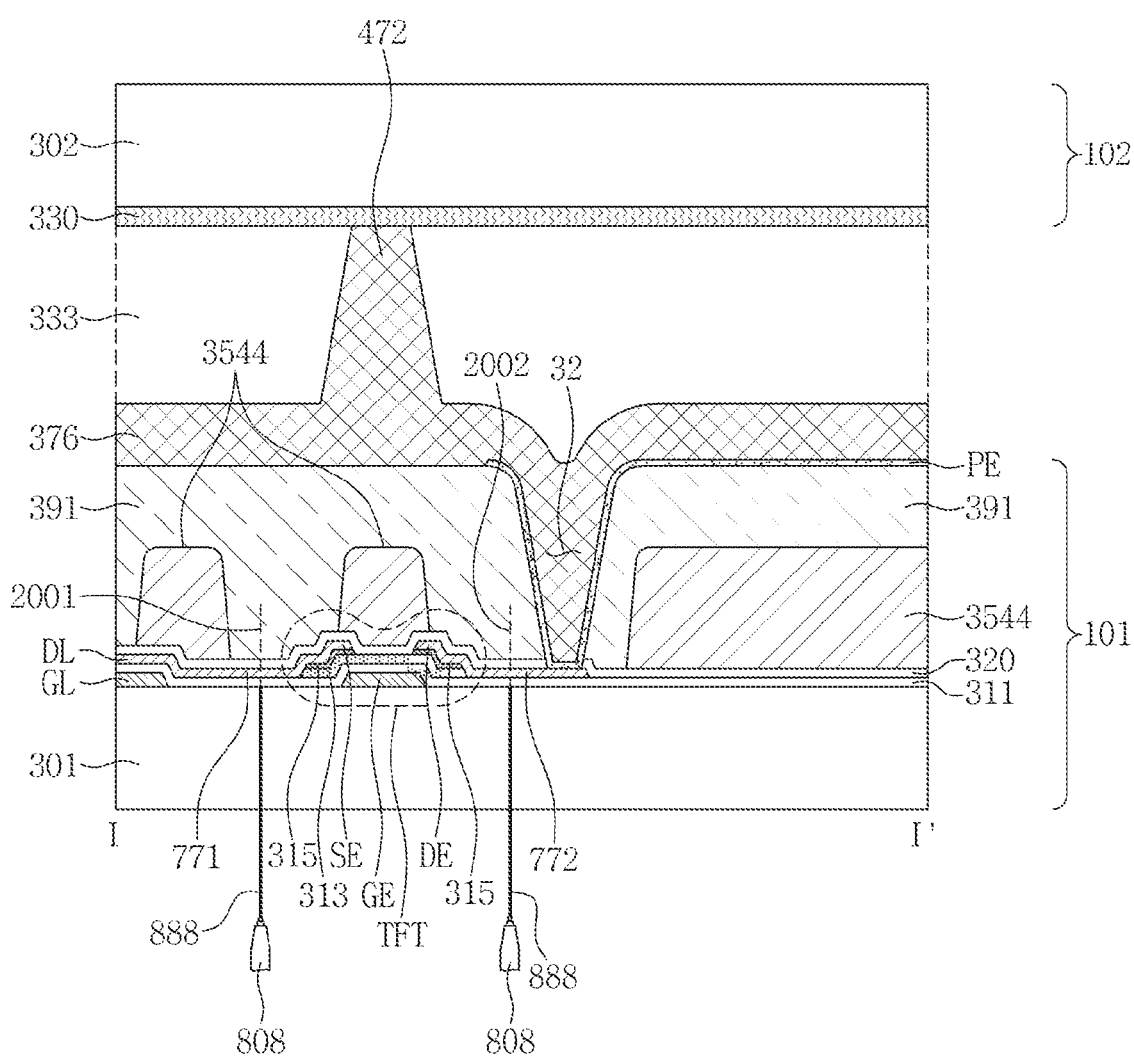
FIG. 16 is a cross-sectional view taken along line I-I' of FIG. 15.
Figure 17:
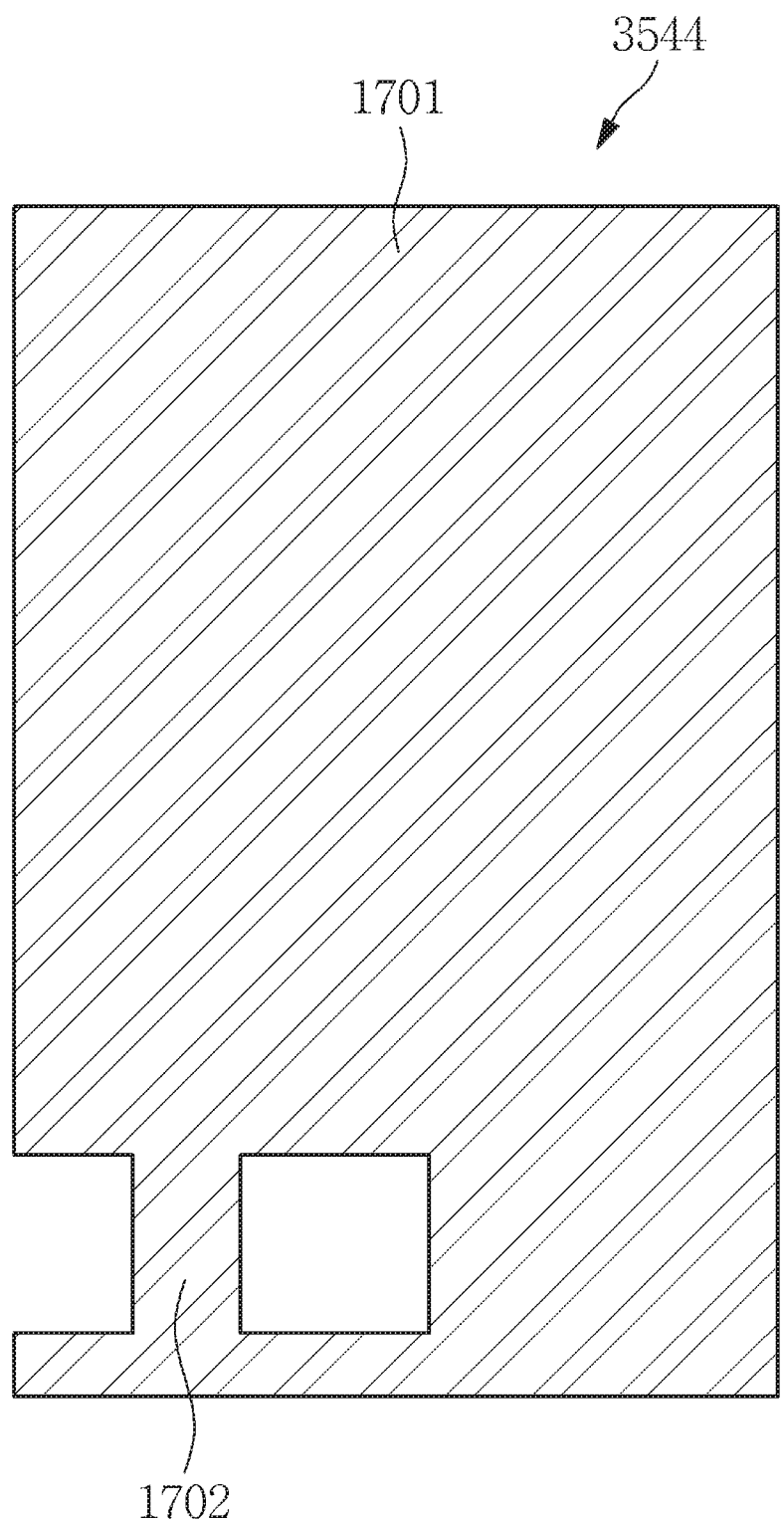
FIG. 17 is a view separately illustrating a color filter of FIG. 15.

FIG. 15 is a plan view illustrating an alternative exemplary embodiment of a pixel corresponding to a single pixel area of FIG. 5, FIG. 16 is a cross-sectional view taken along line I-I' of FIG. 15, and FIG. 17 is a view separately illustrating a color filter of FIG. 15.

The pixel of FIG. 15 is substantially the same as the aforementioned pixel of FIG. 6, and thus descriptions pertaining to the pixel of FIG. 15 will make reference to descriptions pertaining to the aforementioned pixel of FIG. 6.

As illustrated in FIGS. 15 and 16, a portion of a source electrode SE overlaps a gate electrode GE, and another portion (hereinafter, referred to as a first portion 771) of the source electrode SE does not overlap the gate electrode GE. The first portion 771 of the aforementioned source electrode SE does not overlap configurations on the same layer as a layer (e.g., the first substrate 301) on which the gate electrode GE is disposed. In an exemplary embodiment, the first portion 771 does not overlap the gate line GL on the first substrate 301 on which the gate electrode GE is disposed, for example.

A portion of a drain electrode DE overlaps the gate electrode GE, and another portion (hereinafter, a second portion 772) of the drain electrode DE does not overlap the gate electrode GE. The second portion 772 of the aforementioned drain electrode DE does not overlap configurations on the same layer as a layer on which the gate electrode GE is disposed. In an exemplary embodiment, the second portion 772 does not overlap the gate line GL, for example.

As illustrated in FIGS. 15 and 16, a color filter 3544 does not overlap a portion of at least one of the source electrode SE and the drain electrode DE. In an exemplary embodiment, the color filter 3544 may not overlap the first portion 771 of the aforementioned source electrode SE, for example. In an alternative exemplary embodiment, the color filter 3544 may not overlap the second portion 772 of the aforementioned drain electrode DE. In addition, the color filter 3544 does not overlap a drain contact hole 32.

The color filter 3544 overlaps a pixel electrode PE. In addition, the color filter 3544 overlaps another portion of a switching element TFT except for the first portion 771 and the second portion 772. In an exemplary embodiment, as illustrated in FIG. 17, the color filter 3544 may include a first overlapping portion 1701 and a second overlapping portion 1702, and the first overlapping portion 1701 of the color filter 3544 may overlap the pixel electrode PE, and the second overlapping portion 1702 of the color filter 3544 may overlap another portion of the aforementioned switching element TFT (another portion of the switching element except for the first portion 771 and the second portion 772), for example. In an exemplary embodiment, the second overlapping portion 1702 may overlap a portion of the source electrode SE, a portion of the drain electrode DE, and the gate electrode GE, for example. In an exemplary embodiment, the first overlapping portion 1701 may further overlap the gate line GL and the data line DL.

A column spacer 472 may overlap at least one of the first overlapping portion 1701 (refer to FIG. 17) and the second overlapping portion 1702 (refer to FIG. 17). In an exemplary embodiment, as illustrated in FIG. 16, the column spacer 472 may overlap the second overlapping portion 1702, for example.

As illustrated in FIG. 17, the first overlapping portion 1701 and the second overlapping portion 1702 may be unitary. In an exemplary embodiment, although not illustrated, the first overlapping portion 1701 and the second overlapping portion 1702 may be separated from each other. In other words, the first overlapping portion 1701 and the second overlapping portion 1702 may not be physically connected to each other in a direct manner.

In a repair process with respect to a defective pixel, an intense light 888 may be irradiated to the first portion 771 of the source electrode SE and the second portion 772 of the drain electrode DE. In an exemplary embodiment, a first cutting path 2001 and a second cutting path 2002 are illustrated in FIGS. 15 and 16, and the intense light 888 may be irradiated along the first cutting path 2001 and the second cutting path 2002, for example. The first cutting path 2001 is positioned on the first portion 771 and the second cutting path 2002 is positioned on the second portion 772.

The intense light 888 is irradiated from a light emitting apparatus 808 to the first portion 771 of the source electrode SE and the second portion 772 of the drain electrode DE through a rear surface of the first panel 101. In an exemplary embodiment, as illustrated in FIG. 16, the intense light 888 is irradiated to the first portion 771 and the second portion 772 through the first substrate 301, for example. In the exemplary embodiment, the intense light 888 is sequentially transmitted through the first substrate 301 and the gate insulating layer 311 to reach the first portion 771 and the second portion 772. As the intense light 888 propagates along the first cutting path 2001, the source electrode SE is cut, and as the intense light 888 propagates along the second cutting path 2002, the drain electrode DE is cut.

In an exemplary embodiment, a passivation layer 320 on the source electrode SE and the drain electrode DE may be damaged in the aforementioned cutting process. In the exemplary embodiment, in a case where the color filter 354 is disposed above the passivation layer 320, the intense light 888 may be irradiated to the color filter 354. In the exemplary embodiment, the color filter 354 is carbonized, and accordingly, a black spot phenomenon in which a portion of a pixel appears dark may occur. In addition, a pigment from a color filter 354 that is damaged by the intense light 888 is diffused toward adjacent pixels such that the adjacent pixels may be contaminated. However, as illustrated in FIGS. 15 and 16, in a case where the color filter 354 is absent in the first portion and the second portion, the damage to the color filter 354 may be prevented in the aforementioned repair process using the intense light 888.

Figure 18:
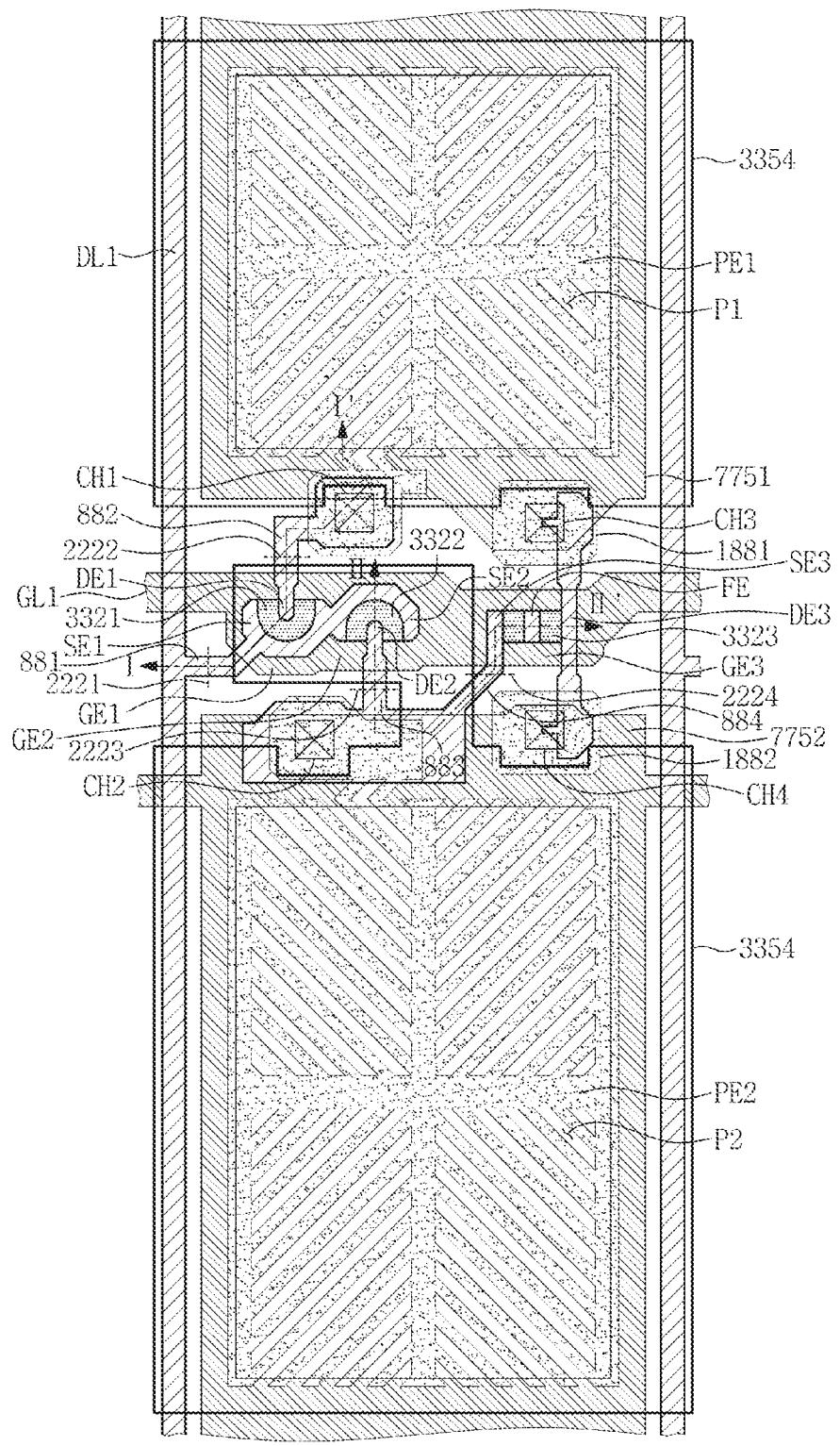
FIG. 18 is a plan view illustrating another alternative exemplary embodiment of a pixel corresponding to the single pixel area of FIG. 5.
Figure 19:
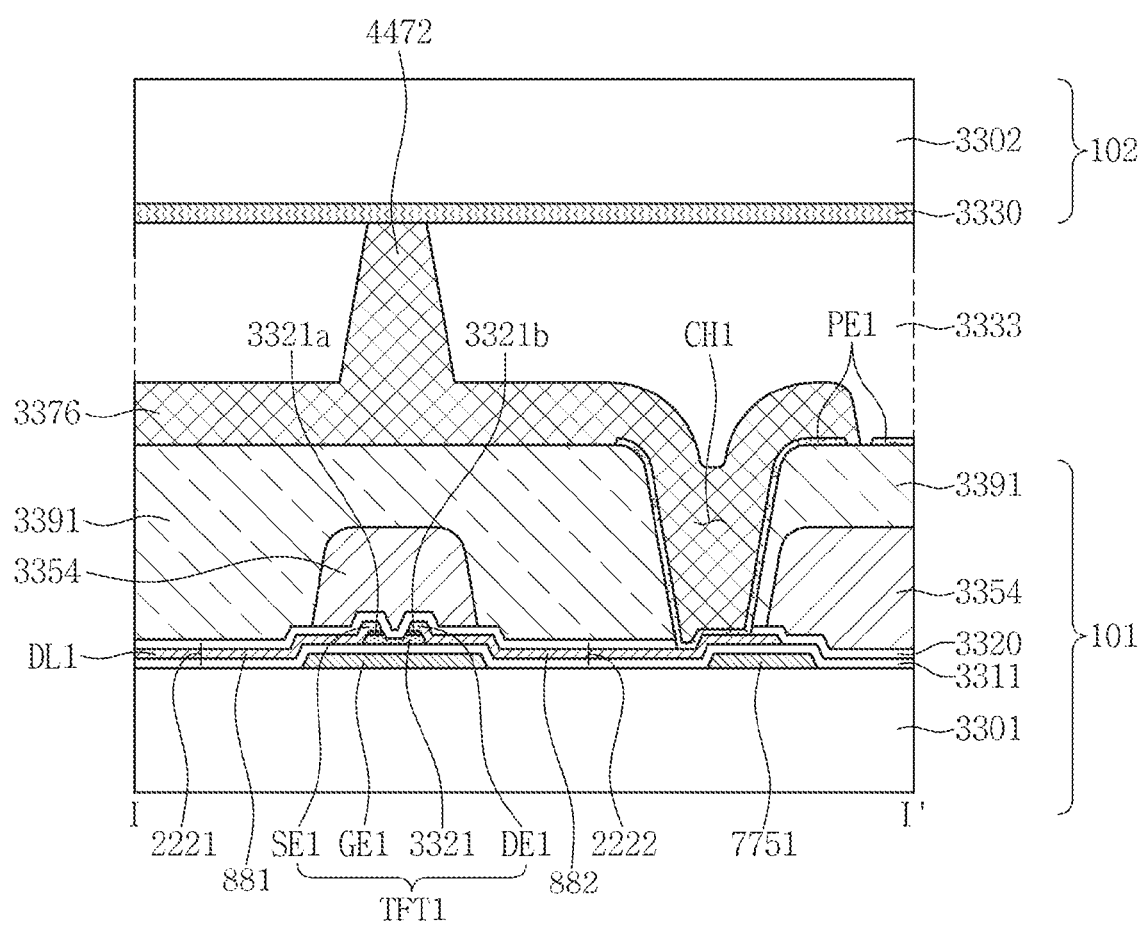
FIG. 19 is a cross-sectional view taken along line I-I' of FIG. 18.
Figure 20:
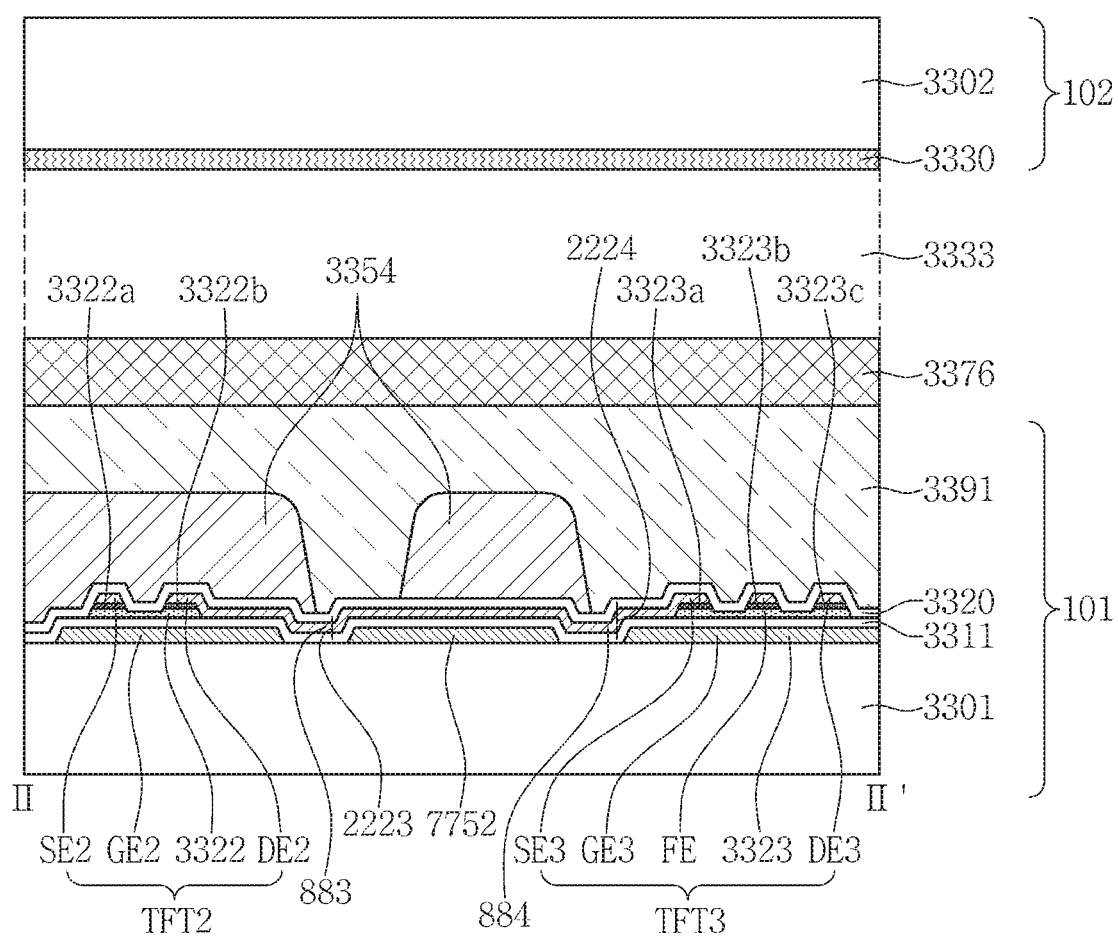
FIG. 20 is a cross-sectional view taken along line II-II' of FIG. 18.
Figure 21:
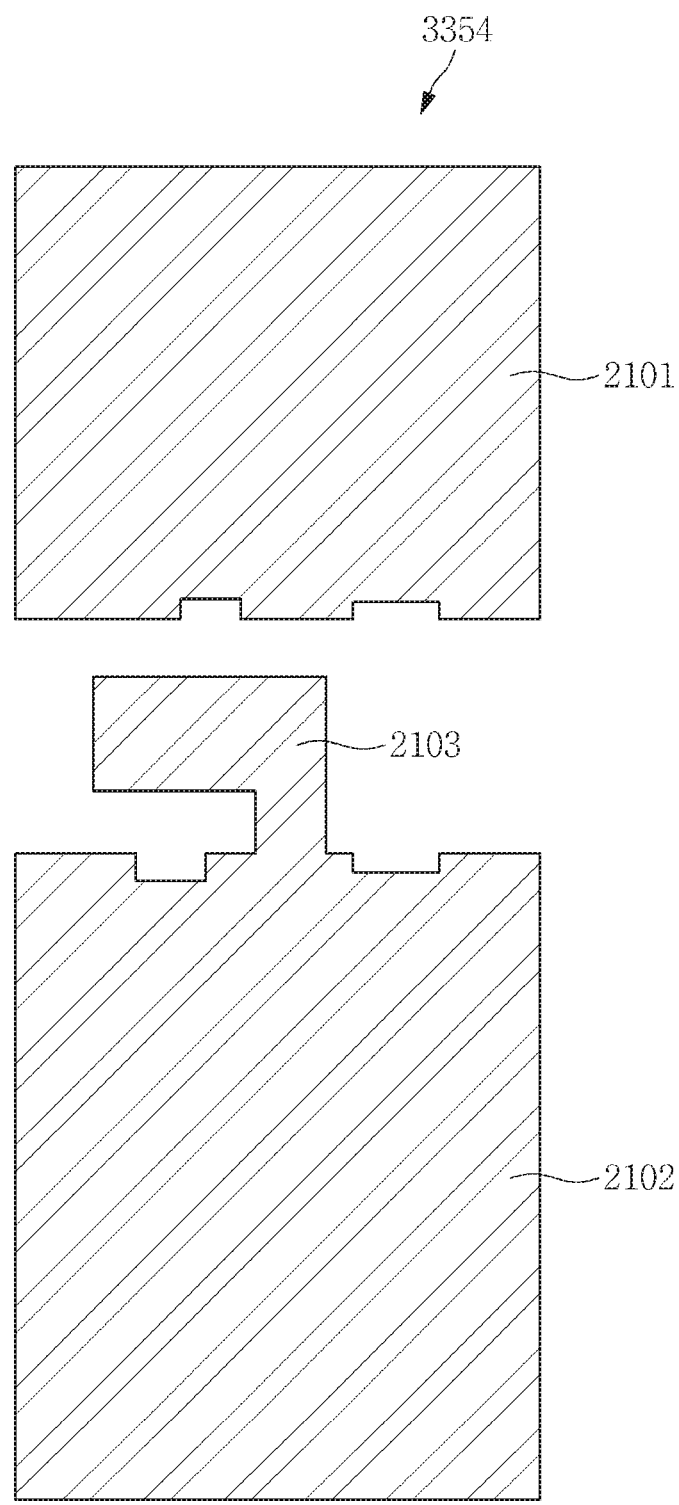
FIG. 21 is a view separately illustrating a color filter of FIG. 18.

FIG. 18 is a plan view illustrating another alternative exemplary embodiment of a pixel corresponding to the single pixel area of FIG. 5, FIG. 19 is a cross-sectional view taken along line I-I' of FIG. 18, FIG. 20 is a cross-sectional view taken along line II-II" of FIG. 18, and FIG. 21 is a view separately illustrating a color filter of FIG. 18.

As illustrated in FIGS. 18, 19, 20, and 21, the pixel includes a first substrate 3301, a gate line GL, a first gate electrode GE1, a second gate electrode GE2, a first storage electrode 7751, a second storage electrode 7752, a gate insulating layer 3311, a first semiconductor layer 3321, a second semiconductor layer 3322, a third semiconductor layer 3323, a first ohmic contact layer 3321*a*, a second ohmic contact layer 3321*b*, a third ohmic contact layer 3322*a*, a fourth ohmic contact layer 3322*b*, a fifth ohmic contact layer 3323*a*, a sixth ohmic contact layer 3323*b*, a data line DL1, a first source electrode SE1, a first drain electrode DE1, a second source electrode SE2, a second drain electrode DE2, a third source electrode SE3, a floating electrode FE, a third drain electrode DE3, a passivation layer 3320, a color filter 3354, an insulating interlayer 3391, a first sub-pixel electrode PE1, a second sub-pixel electrode PE2, a second substrate 3302, a light blocking portion 3376, a common electrode 3330, and a liquid crystal layer 3333. Herein, the first ohmic contact layer 3321*a*, the second ohmic contact layer 3321*b*, the third ohmic contact layer 3322*a*, the fourth ohmic contact layer 3322*b*, the fifth ohmic contact layer 3323*a*, and the sixth ohmic contact layer 3323*b* may be omitted.

As illustrated in FIGS. 18 and 19, a first switching element TFT1 includes the first gate electrode GE1, the first semiconductor layer 3321, the first source electrode SE1, and the first drain electrode DE1.

As illustrated in FIGS. 18 and 20, a second switching element TFT2 includes the second gate electrode GE2, the second semiconductor layer 3322, the second source electrode SE2, and the second drain electrode DE2.

As illustrated in FIGS. 18 and 20, a third switching element TFT3 includes the third gate electrode GE3, the third semiconductor layer 3323, the third source electrode SE3, the floating electrode FE, and the third drain electrode DE3.

As illustrated in FIGS. 18 and 19, the gate line GL1 is disposed on a first substrate 3301. In detail, the gate line GL is disposed between a first sub-pixel area P1 and a second sub-pixel area P2 of the first substrate 3301.

As illustrated in FIG. 18, the first gate electrode GE1 may have a shape protruding from the gate line GL1. The first gate electrode GE1 may be a portion of the gate line GL1. The first gate electrode GE1 may include the same material and have the same structure (e.g., a multilayer structure) as those of the gate line GL1. The first gate electrode GE1 and the gate line GL1 may be simultaneously provided in the same process.

As illustrated in FIG. 18, the second gate electrode GE2 may have a shape protruding from the gate line GL1. The second gate electrode GE2 may be a portion of the gate line GL1. The second gate electrode GE2 may include the same material and have the same structure (e.g., a multilayer structure) as those of the gate line GL1. The second gate electrode GE2 and the gate line GL1 may be simultaneously provided in the same process.

As illustrated in FIG. 18, the third gate electrode GE3 may have a shape protruding from the gate line GL1. The third gate electrode GE3 may be a portion of the gate line GL1. The third gate electrode GE3 may include the same material and have the same structure (e.g., a multilayer structure) as those of the gate line GL1. The third gate electrode GE3 and the gate line GL1 may be simultaneously provided in the same process.

As illustrated in FIG. 18, the first storage electrode 7751 surrounds the first sub-pixel electrode PE1. In an illustrated exemplary embodiment, the first storage electrode 7751 overlaps an edge portion of the first sub-pixel electrode PE1. The first storage electrode 7751 may include the same material and have the same structure (e.g., a multilayer structure) as those of the aforementioned gate line GL1. The first storage electrode 7751 and the gate line GL1 may be simultaneously provided in the same process. A first storage voltage is applied to the first storage electrode 7751. The first storage voltage may be the same as a common voltage.

As illustrated in FIG. 18, the second storage electrode 7752 surrounds the second sub-pixel electrode PE2. In an illustrated exemplary embodiment, the second storage electrode 7752 overlaps an edge portion of the second sub-pixel electrode PE2. The second storage electrode 7752 may include the same material and have the same structure (e.g., a multilayer structure) as those of the aforementioned gate line GL1. The second storage electrode 7752 and the gate line GL1 may be simultaneously provided in the same process. A second storage voltage is applied to the second storage electrode 7752. The second storage voltage may be the same as the common voltage. In an exemplary embodiment, the second storage electrodes 7752 of pixels that are adjacent to each other along the gate line GL1 may be connected to one another. In addition, the second storage electrode 7752 and the first storage electrode 7751 of pixels that are adjacent to each other along the data line DL1 may be connected to one another.

As illustrated in FIGS. 19 and 20, the gate insulating layer 3311 is disposed on the gate line GL, the first gate electrode GE1, the second gate electrode GE2, the first storage electrode 7751, and the second storage electrode 7752. In an illustrated exemplary embodiment, the gate insulating layer 3311 is disposed over the entire surface of the first substrate 301 on which the gate line GL1, the first gate electrode GE1, the second gate electrode GE2, the first storage electrode 7751, the second storage electrode 7752, and the storage line 7750 are disposed. An aperture is defined in the gate insulating layer 3311 corresponding to a third contact hole CH3 and a fourth contact hole CH4. A portion of the third drain electrode DE3 and the first storage electrode 7751 are exposed through the third contact hole CH3, and another portion of the third drain electrode DE3 and the second storage electrode 7752 are exposed through the fourth contact hole CH4.

As illustrated in FIG. 19, the data line DL1 is disposed on the gate insulating layer 3311. The data line DL1 intersects the gate line GL1. In an exemplary embodiment, although not illustrated, a portion of the data line DL1 intersecting the gate line GL1 may have a smaller line width than that of another portion of the data line DL1. The data line DL1 may include the same material as that included in the aforementioned data line DL.

As illustrated in FIG. 19, the first semiconductor layer 3321 is disposed on the gate insulating layer 3311. As illustrated in FIGS. 18 and 19, the first semiconductor layer 3321 overlaps at least a portion of the first gate electrode GE1. The first semiconductor layer 3321 may include amorphous silicon, polycrystalline silicon, or the like.

As illustrated in FIG. 19, the first and second ohmic contact layers 3321a and 3321b are disposed on the first semiconductor layer 3321. The first ohmic contact layer 3321a and the second ohmic contact layer 3321b face each other with a channel area of the first switching element TFT therebetween.

As illustrated in FIG. 20, the second semiconductor layer 3322 is disposed on the gate insulating layer 3311. As illustrated in FIGS. 18 and 20, the second semiconductor layer 3322 overlaps at least a portion of the second gate electrode GE2. The second semiconductor layer 3322 may include amorphous silicon, polycrystalline silicon, or the like.

As illustrated in FIG. 20, the third and fourth ohmic contact layers 3322a and 3322b are disposed on the second semiconductor layer 3322. The third ohmic contact layer 3322a and the fourth ohmic contact layer 3322b face each other with a channel area of the second switching element TFT2 therebetween.

The first ohmic contact layer 3321a and the aforementioned third ohmic contact layer 3322a are connected to each other. In an exemplary embodiment, the first ohmic contact layer 3321a and the aforementioned third ohmic contact layer 3322a may be unitary, for example.

As illustrated in FIG. 20, the third semiconductor layer 3323 is disposed on the gate insulating layer 3311. As illustrated in FIGS. 18 and 20, the third semiconductor layer 3323 overlaps at least a portion of the third gate electrode GE3.

As illustrated in FIG. 20, the fifth, sixth, and seventh ohmic contact layers 3323a, 3323b, and 3323c are disposed on the third semiconductor layer 3323. The fifth ohmic contact layer 3323a and the sixth ohmic contact layer 3323b face each other with a first channel area of the third switching element TFT3 therebetween, and the sixth ohmic contact layer 3323b and the seventh ohmic contact layer 3323c face each other with a second channel area of the third switching element TFT3 therebetween.

As illustrated in FIG. 19, the first source electrode SE1 is disposed on the first ohmic contact layer 3321a and the gate insulating layer 3311. As illustrated in FIG. 19, the first source electrode SE1 may have a shape protruding from the data line DL1. In an exemplary embodiment, although not illustrated, the first source electrode SE1 may be a portion of the data line DL1. At least a portion of the first source electrode SE1 overlaps the first semiconductor layer 3321 and the first gate electrode GE1. In exemplary embodiments, the first source electrode SE1 may have one of an I-like shape, a C-like shape, and a U-like shape, for example. A first source electrode SE1 having a U-like shape is illustrated in FIG. 18, for example, and a convex portion of the first source electrode SE1 faces toward the second sub-pixel electrode PE2. The first source electrode SE1 may include the same material and have the same structure (e.g., a multilayer structure) as those of the aforementioned data line DL. The first source electrode SE1 and the data line DL1 may be simultaneously provided in the same process.

A portion of the first source electrode SE1 overlaps the first gate electrode GE1, and another portion (hereinafter, a first portion 881) of the first source electrode SE1 does not overlap the first gate electrode GE1. The first portion 881 of the aforementioned first source electrode SE1 does not overlap configurations on the same layer as a layer on which the first gate electrode GE1 is disposed. In an exemplary embodiment, the first portion 881 does not overlap the gate line GL1, the second gate electrode GE2, the third gate electrode GE3, the first storage electrode 7751, and the second storage electrode 7752, for example.

As illustrated in FIG. 19, the first drain electrode DE1 is disposed on the second ohmic contact layer 3321b and the gate insulating layer 3311. At least a portion of the first drain electrode DE1 overlaps the first semiconductor layer 3321 and the first gate electrode GE1. The first drain electrode DE1 is connected to the first sub-pixel electrode PE1. The first drain electrode DE1 may include the same material and have the same structure (e.g., a multilayer structure) as those of the aforementioned data line DL1. The first drain electrode DE1 and the data line DL1 may be simultaneously provided in the same process.

A portion of the first drain electrode DE1 overlaps the first gate electrode GE1, and another portion (hereinafter, a second portion 882) of the first drain electrode DE1 does not overlap the first gate electrode GE1. The second portion 882 of the aforementioned first drain electrode DE1 does not overlap configurations on the same layer as a layer on which the first gate electrode GE1 is disposed. In an exemplary embodiment, the second portion 882 does not overlap the gate line GL1, the second gate electrode GE2, the third gate electrode GE3, the first storage electrode 7751, and the second storage electrode 7752, for example.

A channel area of the first switching element TFT1 is disposed at a portion of the first semiconductor layer 3321 between the first source electrode SE1 and the first drain electrode DE1. The portion of the first semiconductor layer 3321 corresponding to the channel area has a less thickness than that of another portion of the first semiconductor layer 3321.

As illustrated in FIG. 20, the second source electrode SE2 is disposed on the third ohmic contact layer 3322a. In an exemplary embodiment, although not illustrated, the third ohmic contact layer 3322a is disposed on the gate insulating layer 3311. The second source electrode SE2 and the first source electrode SE1 are unitary. At least a portion of the second source electrode SE2 overlaps the second semiconductor layer 3322 and the second gate electrode GE2. In exemplary embodiments, the second source electrode SE2 may have one of an I-like shape, a C-like shape, and a U-like shape, for example. The second source electrode SE2 may include the same material and have the same structure (e.g., a multilayer structure) as those of the aforementioned data line DL1. The second drain electrode DE2 and the data line DL1 may be simultaneously provided in the same process.

As illustrated in FIG. 20, the second drain electrode DE2 is disposed on the fourth ohmic contact layer 3322b and the gate insulating layer 3311. At least a portion of the second drain electrode DE2 overlaps the second semiconductor layer 3322 and the second gate electrode GE2. The second drain electrode DE2 is connected to the second sub-pixel electrode PE2. The second drain electrode DE2 may include the same material and have the same structure (e.g., a multilayer structure) as those of the aforementioned data line DL1. The second drain electrode DE2 and the data line DL1 may be simultaneously provided in the same process.

A portion of the second drain electrode DE2 overlaps the second gate electrode GE2, and another portion (hereinafter, a third portion 883) of the second drain electrode DE2 does not overlap the second gate electrode GE2. The third portion 883 of the aforementioned second drain electrode DE2 does not overlap configurations on the same layer as a layer on which the second gate electrode GE2 is disposed. In an exemplary embodiment, the third portion 883 does not overlap the gate line GL1, the first gate electrode GE1, the third gate electrode GE3, the first storage electrode 7751, and the second storage electrode 7752, for example.

A channel area of the second switching element TFT2 is disposed at a portion of the second semiconductor layer 3322 between the second source electrode SE2 and the second drain electrode DE2. The portion of the second semiconductor layer 3322 corresponding to the channel area has a less thickness than that of another portion of the second semiconductor layer 3322.

As illustrated in FIG. 20, the third source electrode SE3 is disposed on the fifth ohmic contact layer 3323a and the gate insulating layer 3311. The third source electrode SE3 and the second drain electrode DE2 are unitary. At least a portion of the third source electrode SE3 overlaps the third semiconductor layer 3323 and the third gate electrode GE3. In exemplary embodiments, the third source electrode SE3 may have one of an I-like shape, a C-like shape, and a U-like shape, for example. The third source electrode SE3 may include the same material and have the same structure (e.g., a multilayer structure) as those of the aforementioned data line DL1. The third source electrode SE3 and the data line DL1 may be simultaneously provided in the same process.

A portion of the third source electrode SE3 overlaps the third gate electrode GE3, and another portion (hereinafter, a fourth portion 884) of the third source electrode SE3 does not overlap the third gate electrode GE3. The fourth portion 884 of the aforementioned third source electrode SE3 does not overlap configurations on the same layer as a layer on which the third gate electrode GE3 is disposed. In an exemplary embodiment, the fourth portion 884 does not overlap the gate line GL1, the first gate electrode GE1, the second gate electrode GE2, the first storage electrode 7751, and the second storage electrode 7752, for example.

As illustrated in FIG. 20, the floating electrode FE is disposed on the sixth ohmic contact layer 3323b. The floating electrode FE does not contact any conductor except for the sixth ohmic contact layer 3323b. At least a portion of the floating electrode FE overlaps the third semiconductor layer 3323 and the third gate electrode GE3. In exemplary embodiments, the floating electrode FE may have one of an I-like shape, a C-like shape, and a U-like shape, for example. The floating electrode FE may include the same material and have the same structure (e.g., a multilayer structure) as those of the aforementioned data line DL1. The floating electrode FE and the data line DL1 may be simultaneously provided in the same process.

As illustrated in FIG. 20, the third drain electrode DE3 is disposed on the seventh ohmic contact layer 3323c. In an exemplary embodiment, although not illustrated, the third drain electrode DE3 is also disposed on the gate insulating layer 3311. At least a portion of the third drain electrode DE3 overlaps the second semiconductor layer 3322 and the third gate electrode GE3. The third drain electrode DE3 is connected to the first storage electrode 7751 and the second storage electrode 7752. The third drain electrode DE3 may include the same material and have the same structure (e.g., a multilayer structure) as those of the aforementioned data line DL1. The third drain electrode DE3 and the data line DL1 may be simultaneously provided in the same process.

A first channel area of the third switching element TFT3 is disposed on a portion of the third semiconductor layer 3323 between the third source electrode SE3 and the floating electrode FE, and a second channel area of the third switching element TFT3 is disposed on a portion of the third semiconductor layer 3323 between the floating electrode FE and the third drain electrode DE3. The portions of the third semiconductor layer 3323 corresponding to the first and second channel areas have a less thickness than that of another portion of the third semiconductor layer 3323.

In an exemplary embodiment, although not illustrated, the first semiconductor layer 3321 may further be disposed between the gate insulating layer 3311 and the first source electrode SE1. In addition, the first semiconductor layer 3321 may further be disposed between the gate insulating layer 3311 and the first drain electrode DE1. Herein, a portion of the first semiconductor layer 3321 between the gate insulating layer 3311 and the first source electrode SE1 is referred to as a first additional semiconductor layer, and a portion of the first semiconductor layer 3321 between the gate insulating layer 3311 and the first drain electrode DE1 is referred to as a second additional semiconductor layer. In an exemplary embodiment, the aforementioned first ohmic contact layer 3321a may further be disposed between the first additional semiconductor layer and the first source electrode SE1, and the aforementioned second ohmic contact layer 3321b may further be disposed between the second additional semiconductor layer and the first drain electrode DE1.

In an exemplary embodiment, although not illustrated, the second semiconductor layer 3322 may further be disposed between the gate insulating layer 3311 and the second source electrode SE2. In addition, the second semiconductor layer 3322 may further be disposed between the gate insulating layer 3311 and the second drain electrode DE2. Herein, a portion of the second semiconductor layer 3322 between the gate insulating layer 3311 and the second source electrode SE2 is referred to as a third additional semiconductor layer, and a portion of the second semiconductor layer 3322 between the gate insulating layer 3311 and the second drain electrode DE2 is referred to as a fourth additional semiconductor layer. In an exemplary embodiment, the aforementioned third ohmic contact layer 3322a may further be disposed between the third additional semiconductor layer and the second source electrode SE2, and the aforementioned fourth ohmic contact layer 3322b may further be disposed between the fourth additional semiconductor layer and the second drain electrode DE2.

In an exemplary embodiment, although not illustrated, the third semiconductor layer 3323 may further be disposed between the gate insulating layer 3311 and the third source electrode SE3. In addition, the third semiconductor layer 3323 may further be disposed between the gate insulating layer 3311 and the third drain electrode DE3. Herein, a portion of the third semiconductor layer 3323 between the gate insulating layer 3311 and the third source electrode SE3 is referred to as a fifth additional semiconductor layer, and a portion of the third semiconductor layer 3323 between the gate insulating layer 3311 and the third drain electrode DE3 is referred to as a sixth additional semiconductor layer. In an exemplary embodiment, the aforementioned fifth ohmic contact layer 3323a may further be disposed between the fifth additional semiconductor layer and the third source electrode SE3, and the aforementioned seventh ohmic contact layer 3323c may further be disposed between the sixth additional semiconductor layer and the third drain electrode DE3.

In an exemplary embodiment, although not illustrated, the first semiconductor layer 3321 may further be disposed between the gate insulating layer 3311 and the data line DL1. In an exemplary embodiment, the first semiconductor layer 3321 may further be disposed between the gate insulating layer 3311 and the data line DL1, for example. Herein, a portion of the first semiconductor layer 3321 between the gate insulating layer 3311 and the data line DL1 is referred to as a seventh additional semiconductor layer. In an exemplary embodiment, the aforementioned first ohmic contact layer 3321a may further be disposed between the seventh additional semiconductor layer and the data line DL1.

As illustrated in FIG. 19, the passivation layer 3320 is disposed on the data line DL1, the first source electrode SE1, the second source electrode SE2, the third source electrode SE3, the floating electrode FE, the first drain electrode DE1, the second drain electrode DE2, and the third drain electrode DE3. In an illustrated exemplary embodiment, the passivation layer 3320 is disposed over the entire surface of the first substrate 3301 including the data line DL1, the first source electrode SE1, the second source electrode SE2, the third source electrode SE3, the floating electrode FE, the first drain electrode DE1, the second drain electrode DE2, and the third drain electrode DE3. Apertures are defined in the passivation layer 3320 corresponding to a first contact hole CH1, a second contact hole CH2, the third contact hole CH3, and the fourth contact hole CH4. The first drain electrode DE1 is exposed through the first contact hole CH1 and the second drain electrode DE2 is exposed through the second contact hole CH2.

As illustrated in FIGS. 19 and 20, the color filter 3354 is disposed on the passivation layer 3320. As illustrated in FIG. 18, the color filter 3354 is disposed on the first sub-pixel area P1 and the second sub-pixel area P2. In an exemplary embodiment, the color filter 3354 is absent in the first contact hole CH1, the second contact hole CH2, the third contact hole CH3, and the fourth contact hole CH4. In an exemplary embodiment, an edge portion of one of the color filters 3354 may overlap an edge portion of an adjacent one of the color filters 3354. Color filters having the same color are disposed in the first sub-pixel area P1 and the second sub-pixel area P2 that are included in a single pixel.

As illustrated in FIGS. 18, 19, and 20, the color filter 3354 does not overlap at least one of the first source electrode SE1, the second source electrode SE2, the third source electrode SE3, the first drain electrode DE1, the second drain electrode DE2, and the third drain electrode DE3. In an exemplary embodiment, the color filter 3354 may not overlap the first portion 881 of the aforementioned first source electrode SE1, for example. In addition, the color filter 3354 may not overlap the second portion 882 of the aforementioned first drain electrode DE1. In addition, the color filter 3354 may not overlap the third portion 883 of the aforementioned second drain electrode DE2. In addition, the color filter 3354 may not overlap the fourth portion 884 of the aforementioned third source electrode SE3.

The color filter 3354 overlaps the first sub-pixel electrode PE1 and the second sub-pixel electrode PE2. In addition, the color filter 3354 may overlap another portion of the first, second, and third switching elements TFT1, TFT2, and TFT3 except for the aforementioned first, second, third, and fourth portions 881, 882, 883, and 884. In detail, the color filter 3354 may overlap another portion of the first switching element TFT1 except for the first and second portions 881 and 882, another portion of the second switching element TFT2 except for the third portion 883, and another portion of the third switching element TFT3 except for the fourth portion 884. In an exemplary embodiment, as illustrated in FIG. 21, the color filter 3354 may include a first overlapping portion 2101, a second overlapping portion 2102, and a third overlapping portion 2103, and in the exemplary embodiment, the first overlapping portion 2101 may overlap the first sub-pixel electrode PE1, the second overlapping portion 2102 may overlap the second sub-pixel electrode PE2, and the third overlapping portion 2103 may overlap another portion of the first, second, and third switching elements TFT1, TFT2, and TFT3 (another portion of the first, second, and third switching elements except for the first, second, third, and fourth portions), for example.

In an exemplary embodiment, the insulating interlayer 3391 is disposed on the color filter 3354 and the passivation layer 3320. In the exemplary embodiment, the insulating interlayer 3391 may be disposed over the entire surface of the first substrate 3301 including the color filter 3354 and the passivation layer 3320. Apertures are defined in the insulating interlayer 3391 corresponding to the first contact hole CH1, the second contact hole CH2, the third contact hole CH3, and the fourth contact hole CH4.

The first sub-pixel electrode PE1 is disposed on the insulating interlayer 3391 of the first sub-pixel area P1. The first sub-pixel electrode PE1 is connected to the first drain electrode DE1 through the first drain contact hole CH1. The first sub-pixel electrode PE1 may include the same material as that included the aforementioned pixel electrode PE.

The second sub-pixel electrode PE2 is disposed on the insulating interlayer 3392 of the second sub-pixel area P2. The second sub-pixel electrode PE2 is connected to the second drain electrode DE2 through the second drain contact hole CH2. The second sub-pixel electrode PE2 may include the same material as that included the aforementioned pixel electrode PE.

A first connecting electrode 1881 is disposed on the insulating interlayer 3391, corresponding to the third contact hole CH3. The first connecting electrode 1881 connects a portion of the third drain electrode DE3 and the first storage electrode 7751. The first connecting electrode 1881 may include the same material as that include in the aforementioned pixel electrode PE.

A second connecting electrode 1882 is disposed on the insulating interlayer 3391, corresponding to the fourth contact hole CH4. The second connecting electrode 1882 connects another portion of the third drain electrode DE3 and the second storage electrode 7752. The second connecting electrode 1882 may include the same material as that include in the aforementioned pixel electrode PE.

The light blocking portion 3376 is disposed on a portion of the insulating interlayer 3392 except for the first sub-pixel area P1 and the second sub-pixel area P2.

The columns pacer 4472 is disposed on the light blocking portion 3376. In an exemplary embodiment, the column spacer 4472 may overlap at least one of the first, second, and third overlapping portions 2101, 2102, and 2103. In an exemplary embodiment, as illustrated in FIG. 19, the column spacer 4472 may overlap the third overlapping portion 2103, for example.

As illustrated in FIG. 21, at least two of the first, second, and third overlapping portions 2101, 2102, and 2103 may be unitary. In an exemplary embodiment, at least two of the first, second, and third overlapping portions 2101, 2102, and 2103 may be separated from each other. FIG. 21 illustrates an example in which the second overlapping portion 2102 and the third overlapping portion 2103 are unitary with each other, and the first overlapping portion 2101 and the second overlapping portion 2102 are separated from each other.

In a repair process with respect to a defective pixel, an intense light 888 (refer to FIG. 16) may be irradiated to the first portion 881 (refer to FIG. 19) of the first source electrode SE1, the second portion 882 (refer to FIG. 19) of the first drain electrode DE1, the third portion 883 (refer to FIG. 20) of the second drain electrode DE2, and the fourth portion 884 (refer to FIG. 20) of the third source electrode SE3. In an exemplary embodiment, FIGS. 18, 19, and 20 illustrate a first cutting path 2221, a second cutting path 2222, a third cutting path 2223, and a fourth cutting path 2224, and the intense light 888 may be irradiated along the first, second, third, and fourth cutting paths 2221, 2222, 2223, and 2224, for example. The first cutting path 2221 is disposed on the first portion 881, the second cutting path 2222 is disposed on the second portion 882, the third cutting path 2223 is disposed on the third portion 883, and the fourth cutting path 2224 is disposed on the fourth portion 884.

The intense light 888 is irradiated from a light emitting apparatus to the first portion 881 of the first source electrode SE1, the second portion 882 of the first drain electrode DE1, the third portion 883 of the second drain electrode DE2, and the fourth portion 884 of the third source electrode SE3 through a rear surface of the first panel 101.

In a case where the color filter 3354 is absent in the first, second, third, and fourth portions 881, 882, 883, and 884 as illustrated in FIGS. 18, 19, and 20, damage to the color filter 3354 may be prevented in the repair process using the intense light 888.

Although not illustrated, an exemplary embodiment of an LCD device may further include a first polarizer and a second polarizer. In a case where a surface of the first substrate 3301 and a surface of the second substrate 3302 that face each other are referred to as upper surfaces of the corresponding substrates, respectively, and surfaces opposite to the upper surfaces are referred to as lower surfaces of the corresponding substrates, respectively, the aforementioned first polarizer is disposed on the lower surface of the first substrate 3301, and the second polarizer is disposed on the lower surface of the second substrate 3302.

A transmission axis of the first polarizer is perpendicular to a transmission axis of the second polarizer, and one of the transmission axes thereof is oriented parallel to the gate line GL. In an alternative exemplary embodiment, the LCD device may include only one of the first polarizer and the second polarizer.

Although not illustrated, an exemplary embodiment of an LCD device may further include a light blocking electrode. The light blocking electrode is disposed on the insulating interlayer 3391 to overlap the data line DL1. The light blocking electrode is disposed along the data line. The light blocking electrode may include the same material as that included in the first sub-pixel electrode PE1.

The light blocking electrode receives the aforementioned common voltage. The light blocking electrode prevents forming of an electric field among the data line DL1 and the sub-pixel electrode (i.e., the first and second sub-pixel electrodes PE1 and PE2). In addition, the light blocking electrode and the common electrode 3330, each receiving the same common voltage, are equipotential such that light transmitted through a portion of the liquid crystal layer 3333 between the light blocking electrode and the common electrode 3330 is blocked by the second polarizer. Accordingly, light leakage may be prevented in a portion corresponding to the data line DL1. In addition, as the light blocking electrode may substitute for a portion of the light blocking portion 3376 on the data line DL1, in a case where the light blocking electrode is provided, a portion of the light blocking layer 3376 on the data line DL1 may be removed. Accordingly, in a case where the light blocking electrode is provided, an aperture ratio of a pixel may further increase.

In an exemplary embodiment, the aforementioned light blocking electrode may be disposed on the data line DL illustrated in FIGS. 6 and 7.

FIGS. 22A, 22B, 22C, 22D, 22E, 22F, and 22G are views illustrating alternative exemplary embodiments of a color filter that may be included in a pixel of FIG. 18.

As illustrated in FIGS. 22A, 22B, 22C, 22D, 22E, 22F, and 22G, each of color filters 3354 includes a first overlapping portion 2101, a second overlapping portion 2102, and a third overlapping portion 2103.

Figure 22A:
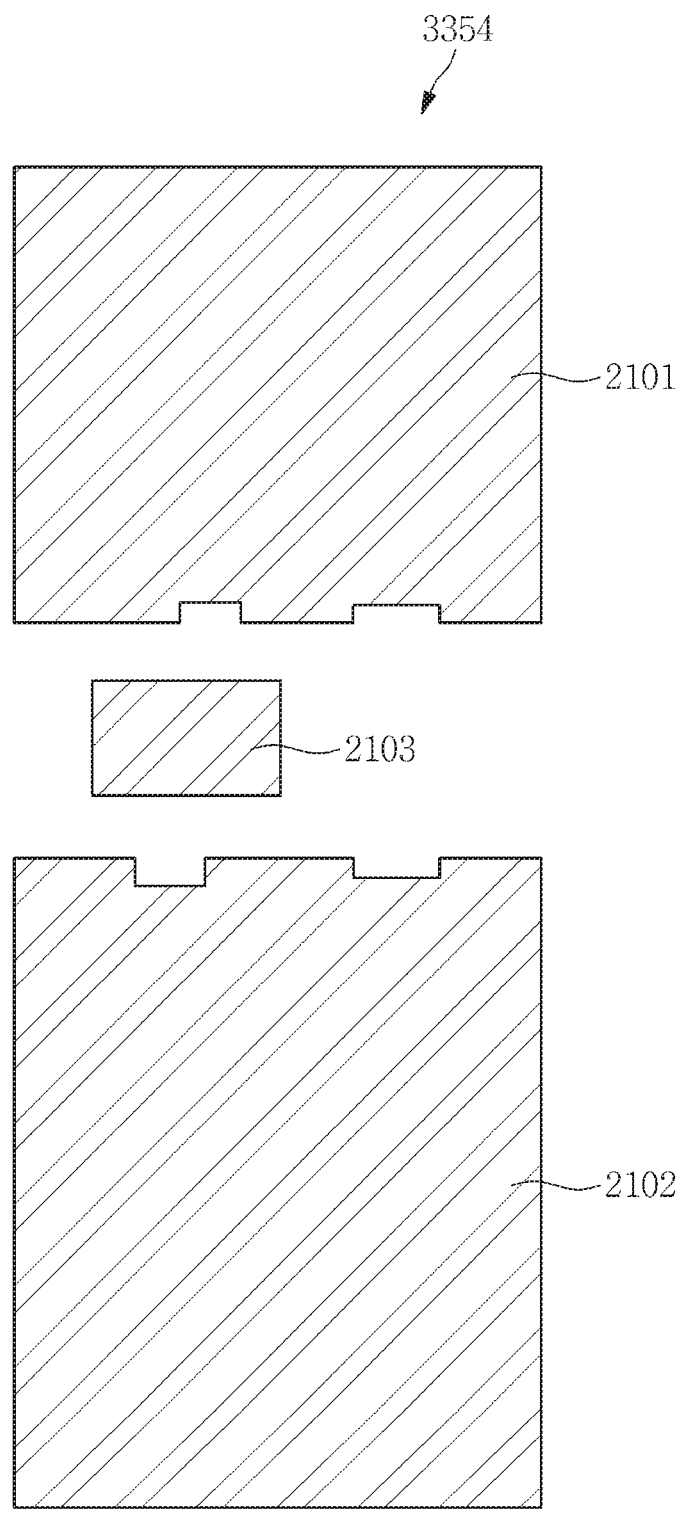
FIGS. 22A, 22B, 22C, 22D, 22E, 22F, and 22G are views illustrating alternative exemplary embodiments of a color filter that may be included in a pixel of FIG. 18.
Figure 22B:
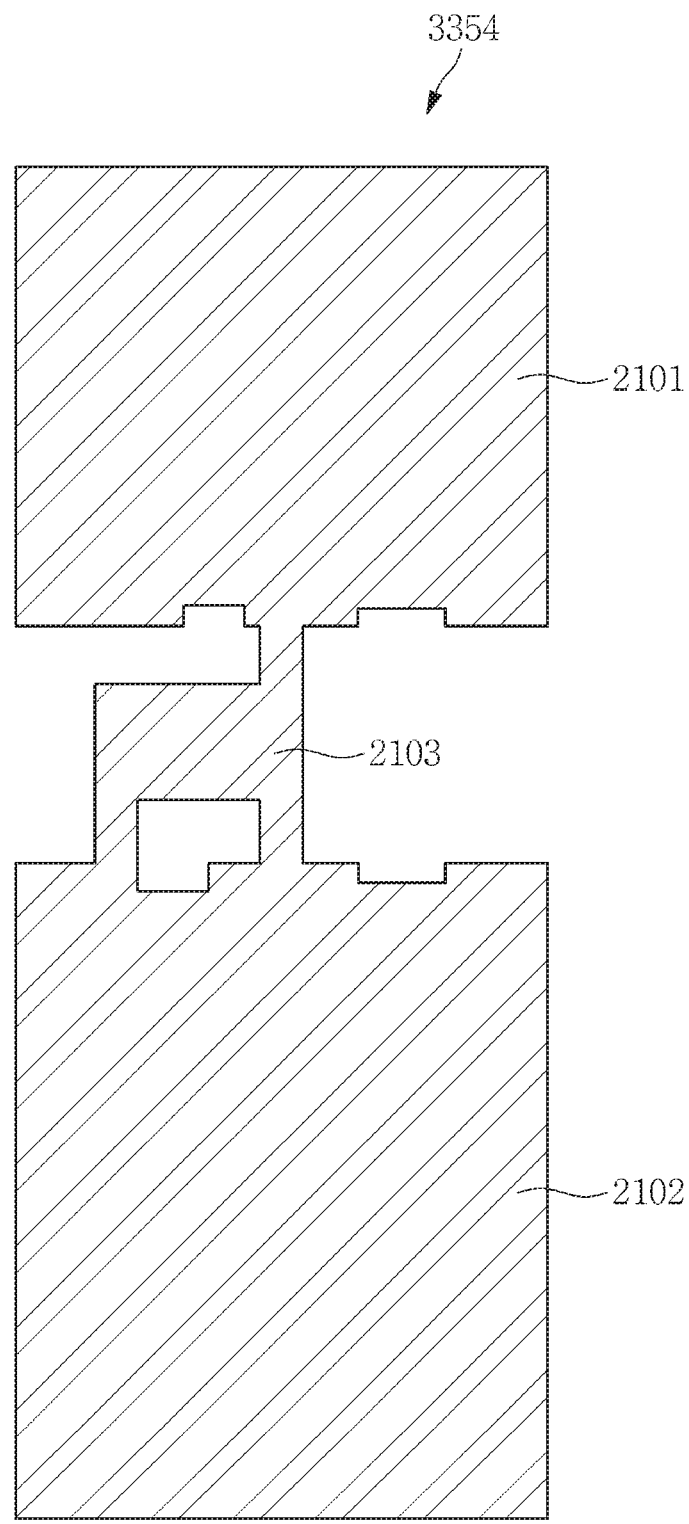
Figure 22C:
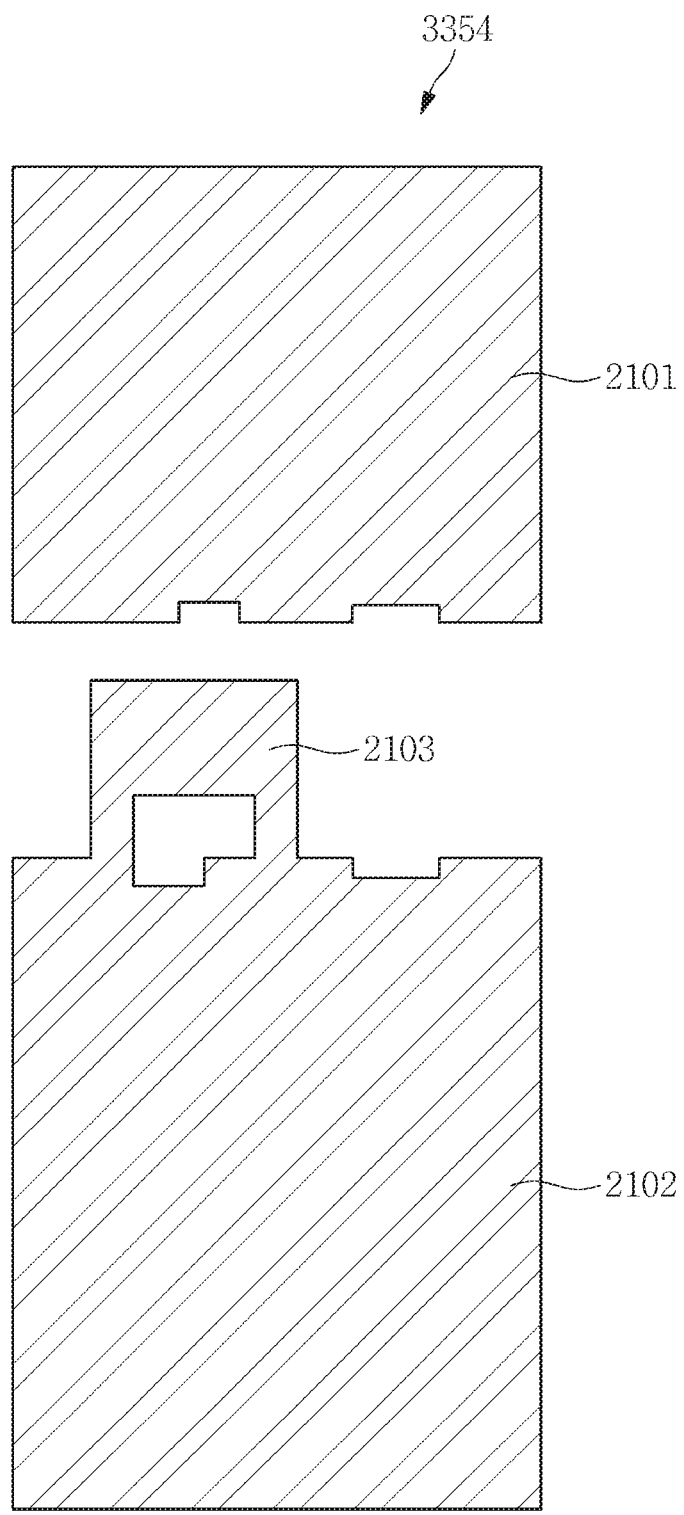
Figure 22D:
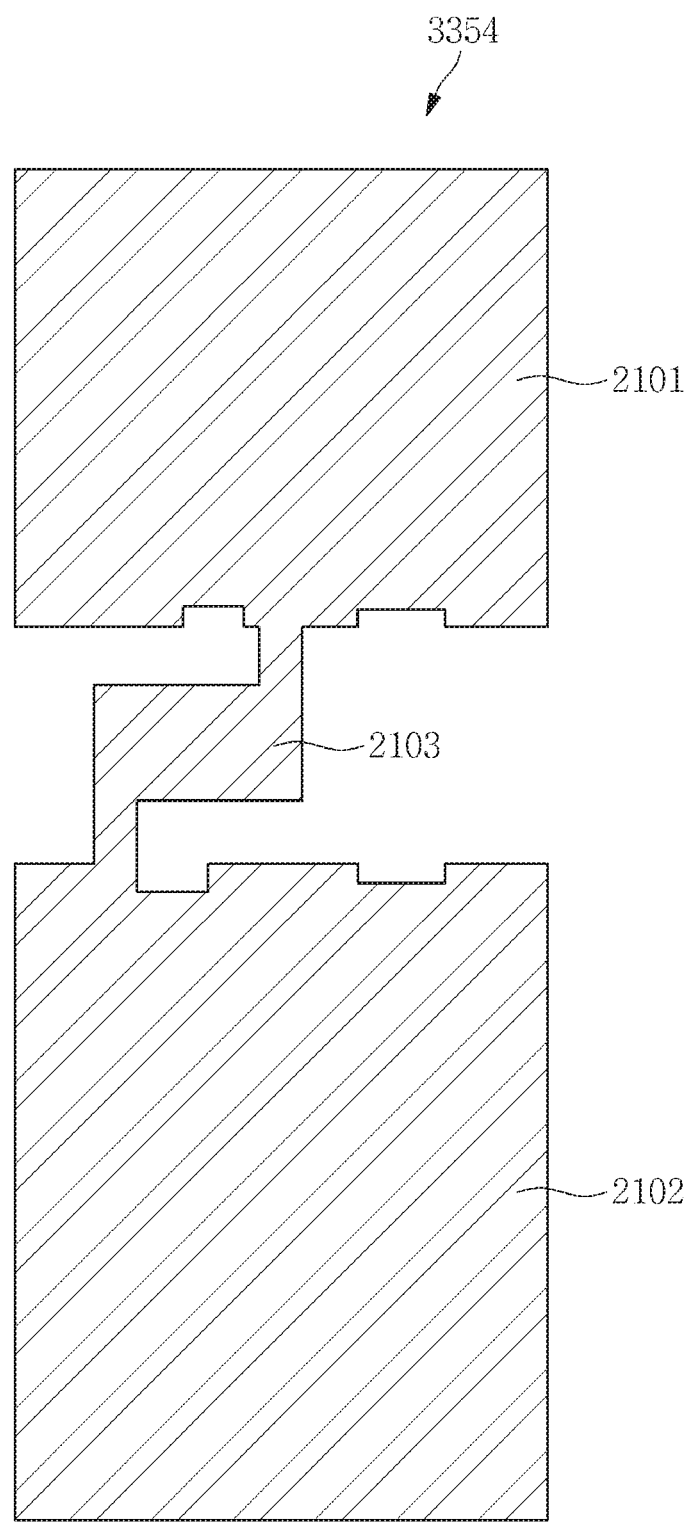
Figure 22E:
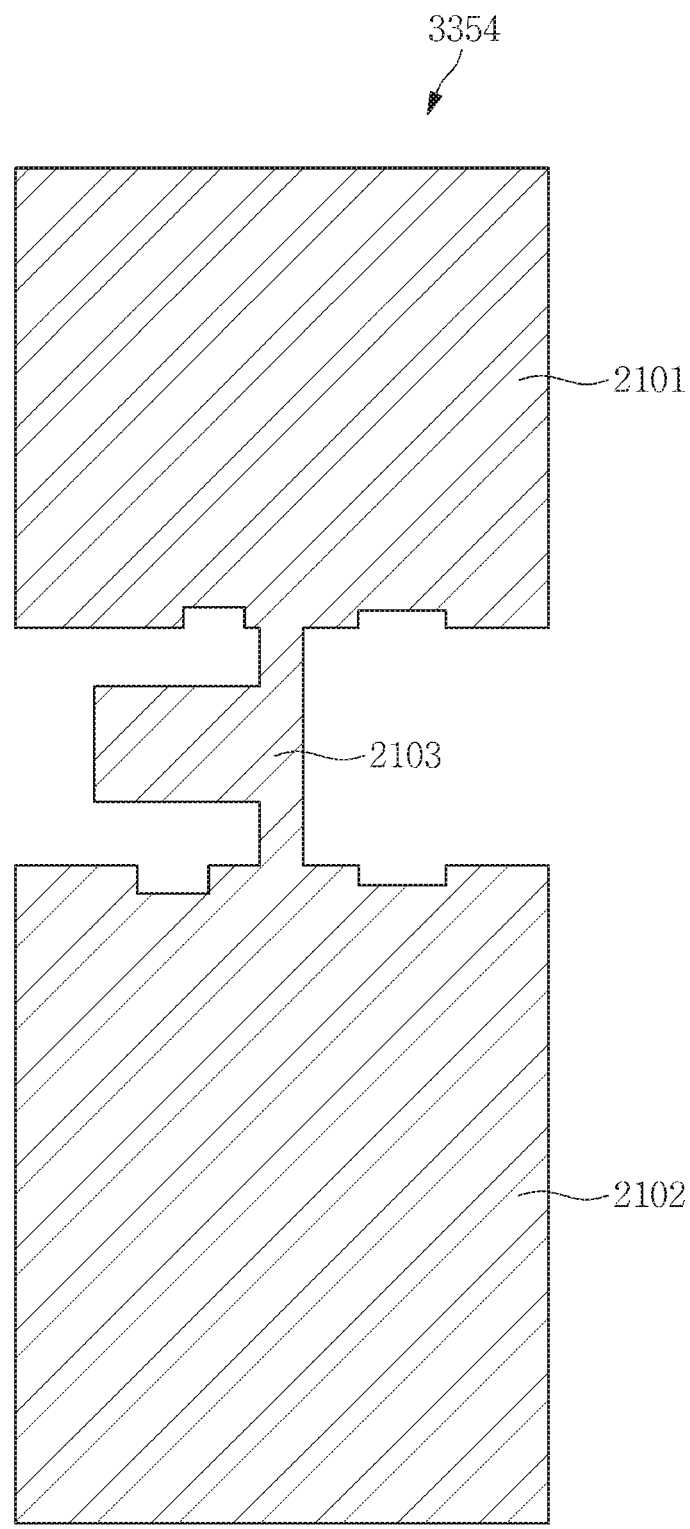
Figure 22F:
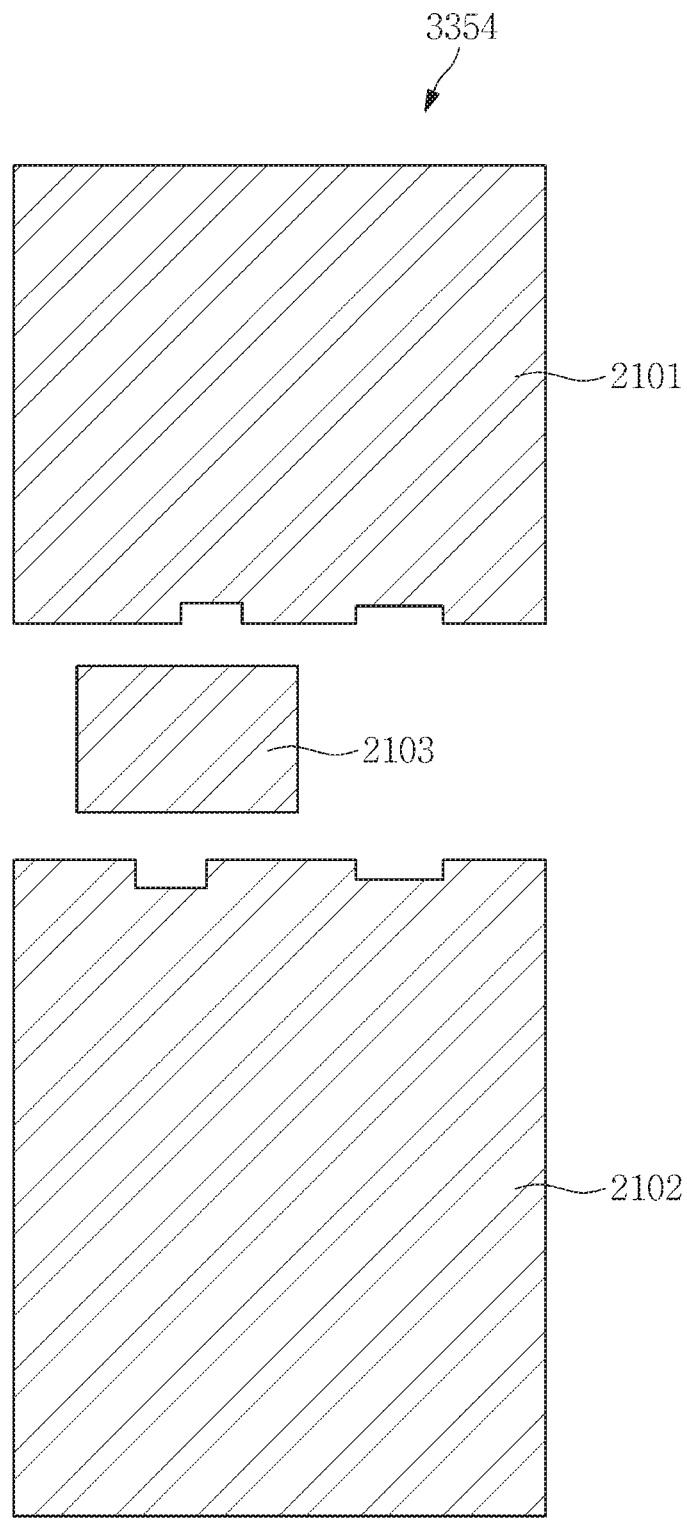
Figure 22G:
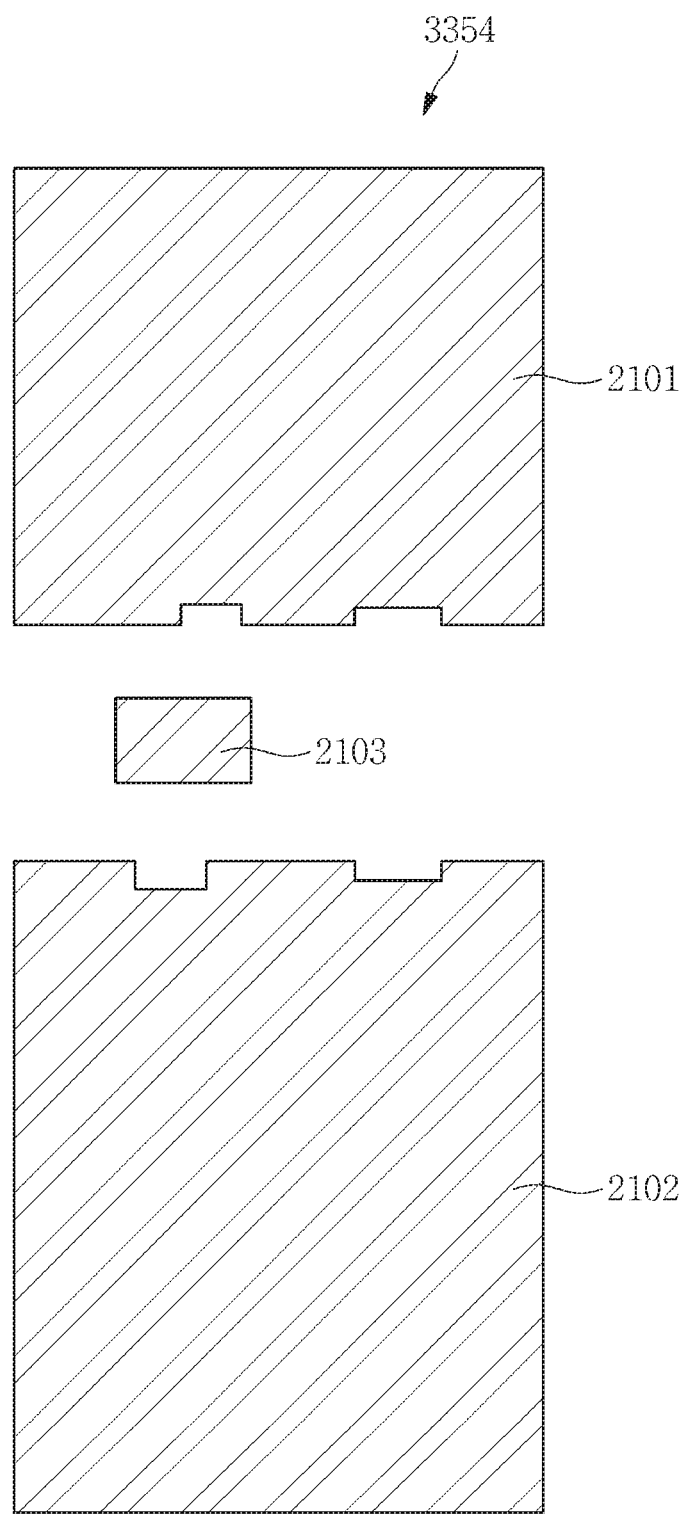

As illustrated in FIGS. 22A, 22F, and 22G, the first overlapping portion 2101, the second overlapping portion 2102, and the third overlapping portion 2103 may be separated from one another.

In addition, as illustrated in FIGS. 22B, 22D, and 22E, the first overlapping portion 2101, the second overlapping portion 2102, and the third overlapping portion 2103 may be unitary with one another.

In addition, as illustrated in FIG. 22C, the second overlapping portion 2102 and the third overlapping portion 2103 may be unitary with each other, and the first overlapping portion 2101 and the second overlapping portion 2102 may be separated from each other.

As set forth above, according to one or more exemplary embodiments, an LCD display device and a method of manufacturing the LCD device may provide the following effects.

First, at least a portion of a short circuit portion includes a darkened area. Accordingly, reflected light may be significantly reduced in the short circuit portion.

Second, a plurality of protruding portions in a single short circuit area is separated from one another. Accordingly, an amount of reflected light may further be reduced significantly in the short circuit portion.

Third, a color filter does not overlap a cutting path of a source electrode and a drain electrode. Accordingly, damage to the color filter may be prevented in a repair process using an intense light (e.g., laser beam). Accordingly, a black spot phenomenon of a pixel may be prevented.

From the foregoing, it will be appreciated that various exemplary embodiments in accordance with the invention have been described herein for purposes of illustration, and that various modifications may be made without departing from the scope and spirit of the teachings. Accordingly, the various exemplary embodiments disclosed herein are not intended to be limiting of the true scope and spirit of the teachings. Various features of the above described and other exemplary embodiments can be mixed and matched in any manner, to produce further embodiments consistent with the invention.

What is claimed is:
1. A liquid crystal display device comprising:
    a first substrate and a second substrate spaced apart from each other;
    a color filter on the first substrate;
    a common line on the first substrate;
    a common electrode on the second substrate;
    a short circuit portion disposed between the common line and the common electrode, the short circuit portion comprising a protruding portion on the common line and a short circuit electrode electrically connected between and overlapping with the common line and the common electrode, and a light blocking portion on the first substrate, wherein at least a portion of the protruding portion comprises a darkened area in a non-display area of the first substrate, a carbonized material of the darkened area is different from the material of the color filter including a blue color filter, the darkened area has a transmittance lower than a transmittance of the blue color filter of the color filter and higher than a transmittance of the light blocking portion, and the darkened area is covered by and not in contact with the short circuit electrode.

2. The liquid crystal display device as claimed in claim 1, further comprising a short circuit electrode on the protruding portion and the common line.

3. The liquid crystal display device as claimed in claim 2, wherein the protruding portion comprises:

a plurality of protrusion patterns between the common line and the short circuit electrode, and at least a portion of at least one of the plurality of protrusion patterns comprises the darkened area.

4. The liquid crystal display device as claimed in claim 3, wherein the at least one of the plurality of protrusion patterns comprising the darkened area further comprises the same material as that included in the color filter.

5. The liquid crystal display device as claimed in claim 4, wherein the color filter comprises at least two unit color filters having different colors from each other.

6. The liquid crystal display device as claimed in claim 5, wherein the at least one of the plurality of protrusion patterns comprising the darkened area further comprises the same material as that included in one of the at least two unit color filters that has a largest height.

7. The liquid crystal display device as claimed in claim 5, wherein at least two protrusion patterns of the plurality of protrusion patterns comprising the darkened area further comprise materials of different unit color filters of the at least two unit color filters, respectively.

8. The liquid crystal display device as claimed in claim 3, further comprising at least one of a gate insulating layer, a passivation layer and an insulating interlayer on the first substrate, wherein the at least one of the plurality of protrusion patterns comprising the darkened area further comprises the same material as that included in one of the at least one of the gate insulating layer, the passivation layer and the insulating interlayer.

9. The liquid crystal display device as claimed in claim 1, further comprising a liquid crystal layer between the first and the second substrate and a sealing portion surrounding the liquid crystal layer and disposed between a non-display area of the first substrate and a non-display area of the second substrate.

10. The liquid crystal display device as claimed in claim 1, the light blocking portion has a first aperture defining a short circuit area in which the short circuit portion is disposed and a second aperture defining a pixel area of the first substrate.

11. The liquid crystal display device as claimed in claim 1, further comprising a gate line, a data line, and a pixel electrode on the first substrate; and a switching element comprising a gate electrode connected to the gate line, a source electrode connected to the data line, and a drain electrode connected to the pixel electrode, wherein the color filter does not overlap at least one of a first portion of the source electrode not overlapping the gate electrode and a second portion of the drain electrode not overlapping the gate electrode.

12. The liquid crystal display device as claimed in claim 11, wherein the color filter overlaps another portion of the switching element except for the first portion and the second portion.

13. The liquid crystal display device as claimed in claim 12, wherein the color filter comprises:

a first overlapping portion overlapping the pixel electrode; and a second overlapping portion overlapping another portion of the switching element.

14. The liquid crystal display device as claimed in claim 13, further comprising a column spacer on the second overlapping portion.

15. The liquid crystal display device as claimed in claim 13, wherein the first overlapping portion and the second overlapping portion are unitary.

16. The liquid crystal display device as claimed in claim 13, wherein the first overlapping portion and the second overlapping portion are separated from each other.

17. The liquid crystal display device as claimed in claim 1, further comprising:

a gate line, a storage electrode, a data line, a first sub-pixel electrode, and a second sub-pixel electrode on the first substrate;

a first switching element comprising a first gate electrode connected to the gate line, a first source electrode connected to the data line, and a first drain electrode connected to the first sub-pixel electrode; and a second switching element comprising a second gate electrode connected to the gate line, a second source electrode connected to the first source electrode, and a second drain electrode connected to the second sub-pixel electrode, wherein the color filter does not overlap at least one of a first portion of the first source electrode not overlapping the first gate electrode, a second portion of the first drain electrode not overlapping the first gate electrode and the storage electrode, and a third portion of the second drain electrode not overlapping the second gate electrode and the storage electrode.

18. The liquid crystal display device as claimed in claim 17, further comprising:

a third switching element comprising a third gate electrode connected to the gate line, a third source electrode connected to the second drain electrode, and a third drain electrode connected to the storage electrode.

19. The liquid crystal display device as claimed in claim 18, wherein the color filter comprises:

a first overlapping portion overlapping the first sub-pixel electrode;

a second overlapping portion overlapping the second sub-pixel electrode.

20. The liquid crystal display device as claimed in claim 19, wherein the color filter further comprises a third overlapping portion overlapping another portion of the first, second, and third switching elements except for the first, second and third portions.

21. The liquid crystal display device as claimed in claim 20, further comprising a column spacer on the third overlapping portion.

22. The liquid crystal display device as claimed in claim 20, wherein at least one of the first overlapping portion and the second overlapping portion is unitary with the third overlapping portion.

23. The liquid crystal display device as claimed in claim 20, wherein the first overlapping portion, the second overlapping portion, and the third overlapping portion are separated from one another.

24. A liquid crystal display device comprising:
a first substrate and a second substrate spaced apart from each other;
a color filter on the first substrate;
a common line on the first substrate;
a common electrode on the second substrate;
a light blocking portion disposed on the first substrate and defining a short circuit area; and
a plurality of short circuit portions between the common line and the common electrode in the short circuit area,
wherein each of the plurality of short circuit portions comprises a protruding portion on the common line and a short circuit electrode electrically connected between and overlapping with the common line and the common electrode,
at least a portion of the protruding portion in a non-display area of the first substrate comprises a darkened area which includes a carbonized material different from the material of the color filter including a blue color filter, the darkened area has a transmittance lower than a transmittance of the blue color filter of the color filter and higher than a transmittance of the light blocking portion, and
the darkened area is covered by and not in contact with the short circuit electrode.

25. The liquid crystal display device as claimed in claim 24, wherein the protruding portion has one of a square shape, a rectangular shape, a circular shape, and an elliptical shape.

26. The liquid crystal display device as claimed in claim 24, wherein each side of the protruding portion has a length greater than or equal to about 20 micrometers.

27. The liquid crystal display device as claimed in claim 24, wherein a length between adjacent ones of the protruding portions is in a range of about 1 micrometer to about 10 micrometers.

28. The liquid crystal display device as claimed in claim 24, further comprising short circuit electrodes on the protruding portion and the common line,
wherein the respective short circuit electrodes of the plurality of short circuit portions are connected to one another.

29. The liquid crystal display device as claimed in claim 24, further comprising short circuit electrodes on the protruding portion and the common line,
wherein the respective protruding portions of the plurality of short circuit portions are disposed on different portions of the common line.

30. The liquid crystal display device as claimed in claim 24, wherein the carbonized material includes a carbonized color filter.

* * * * *